March 25, 1924.
E. J. CONLEY ET AL
1,487,840
MACHINE FOR FORMING SEALED FOIL PACKAGES
Filed Jan. 17, 1923     25 Sheets-Sheet 11
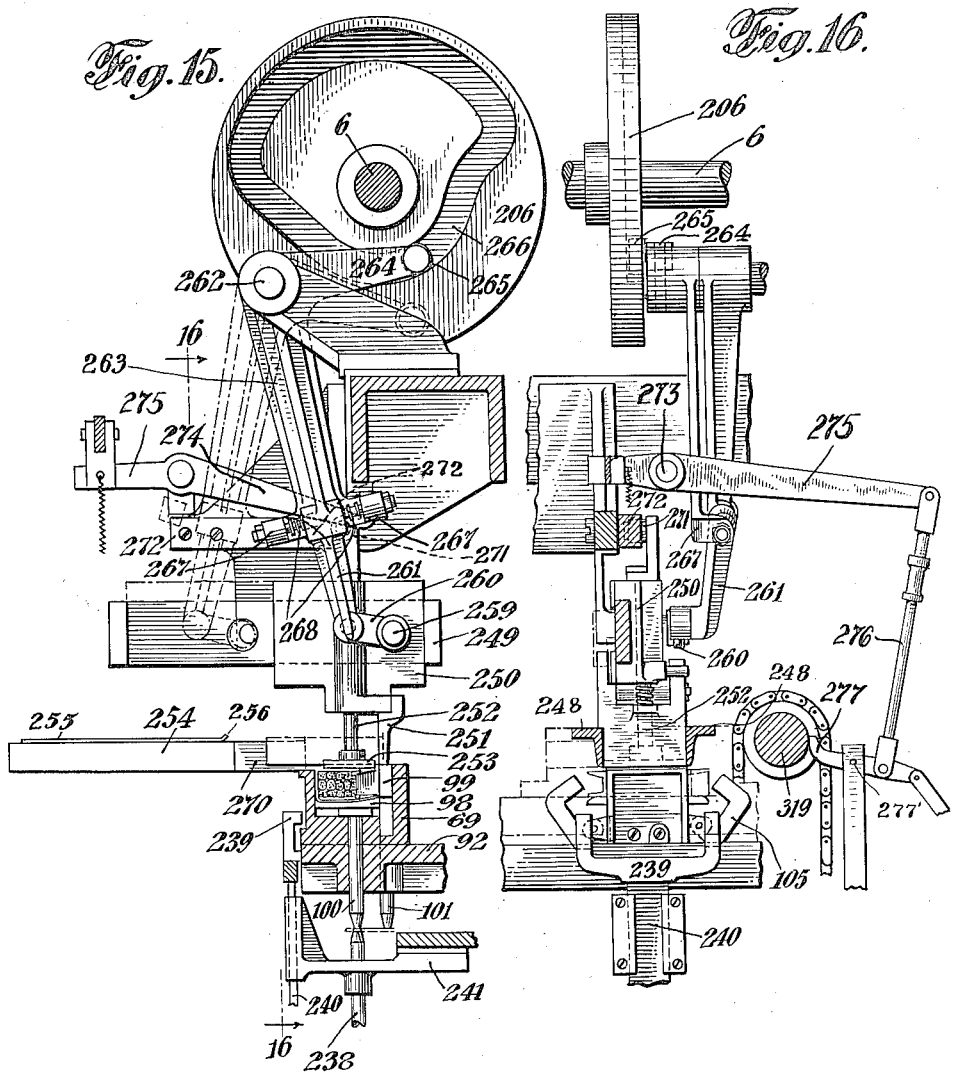

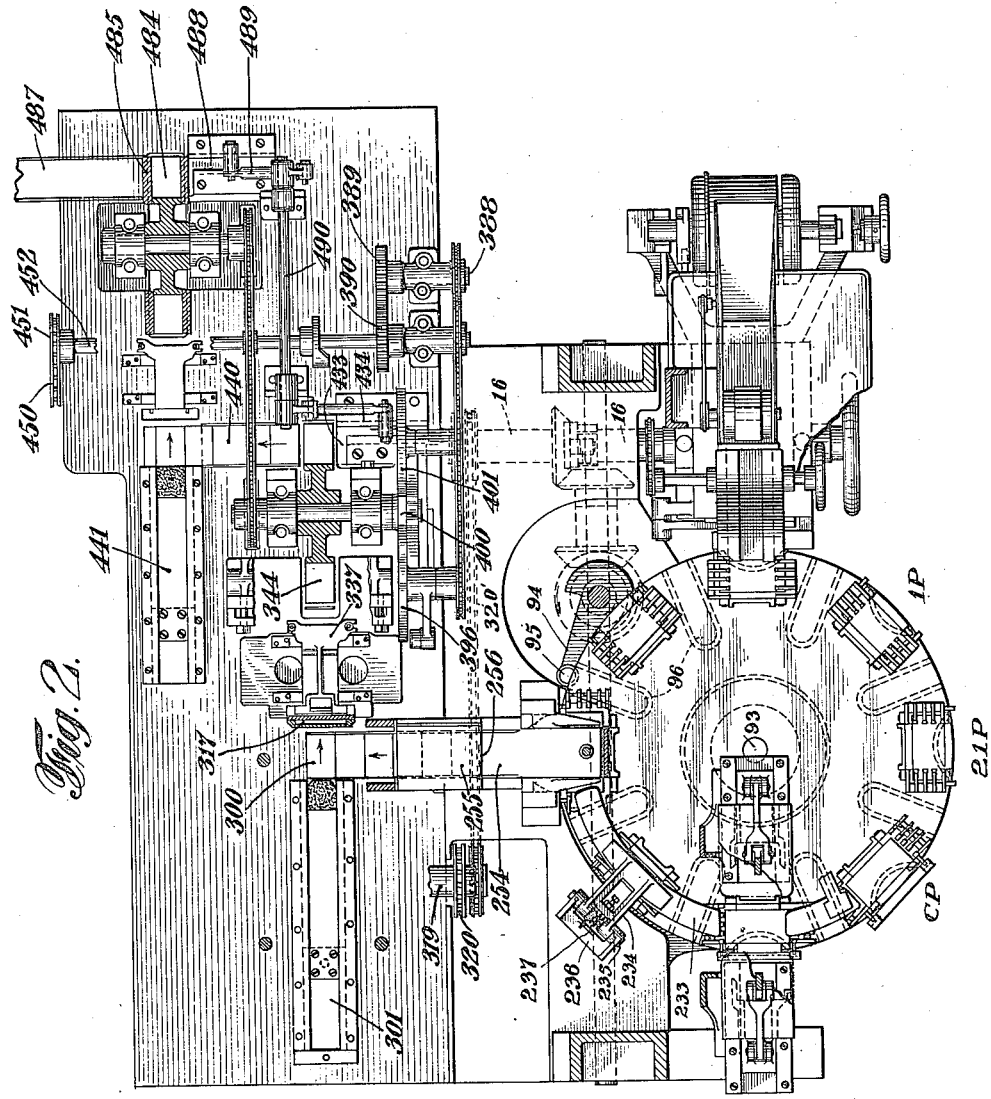

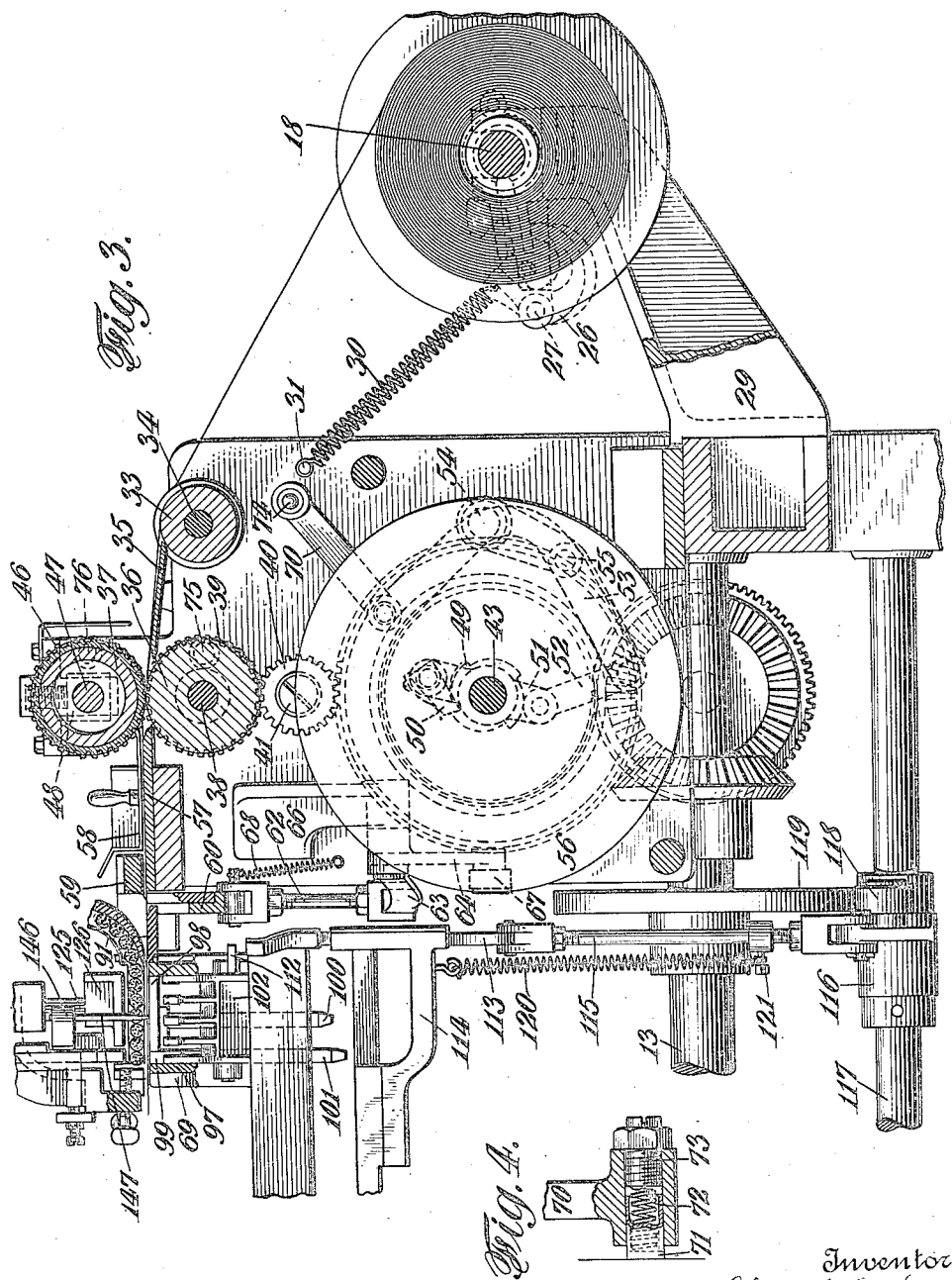

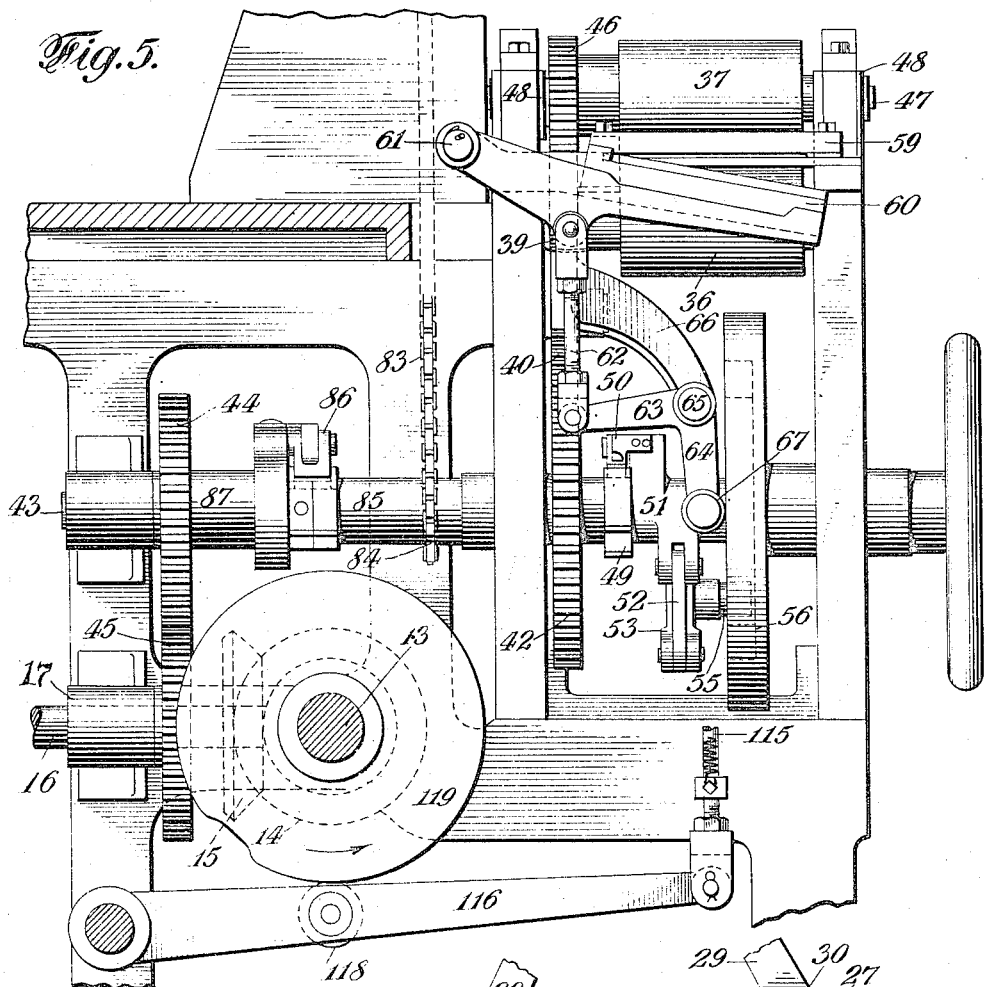
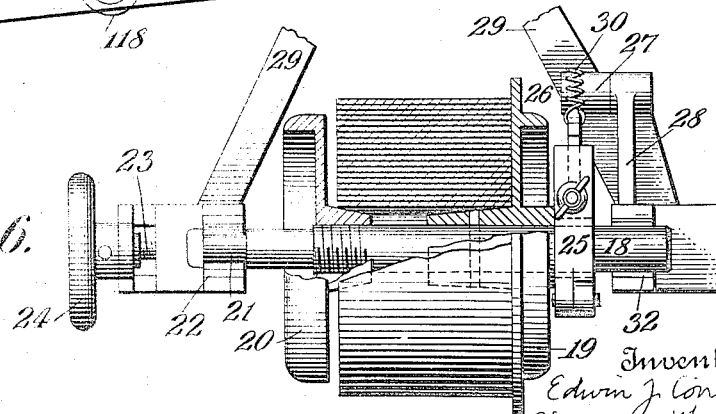

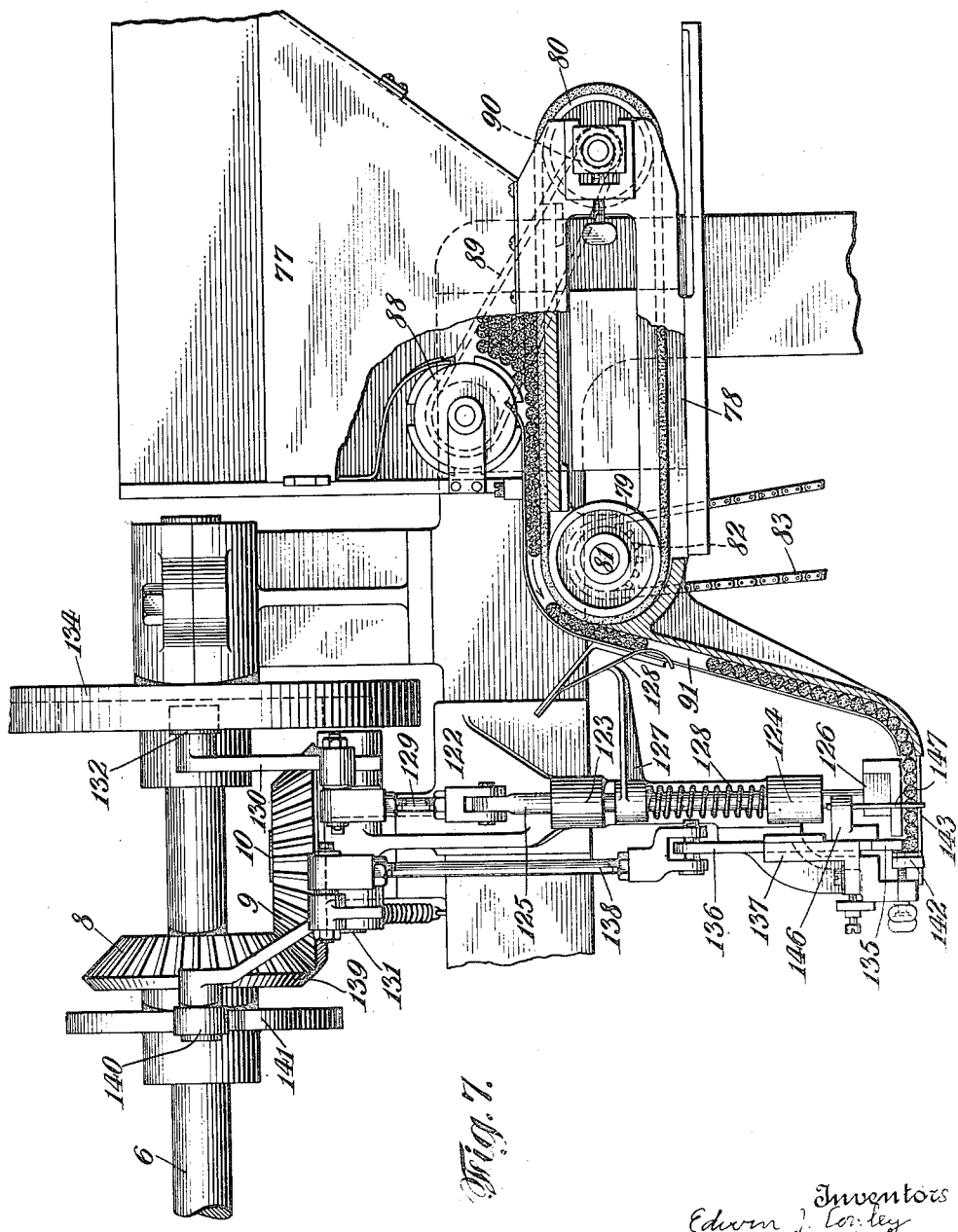

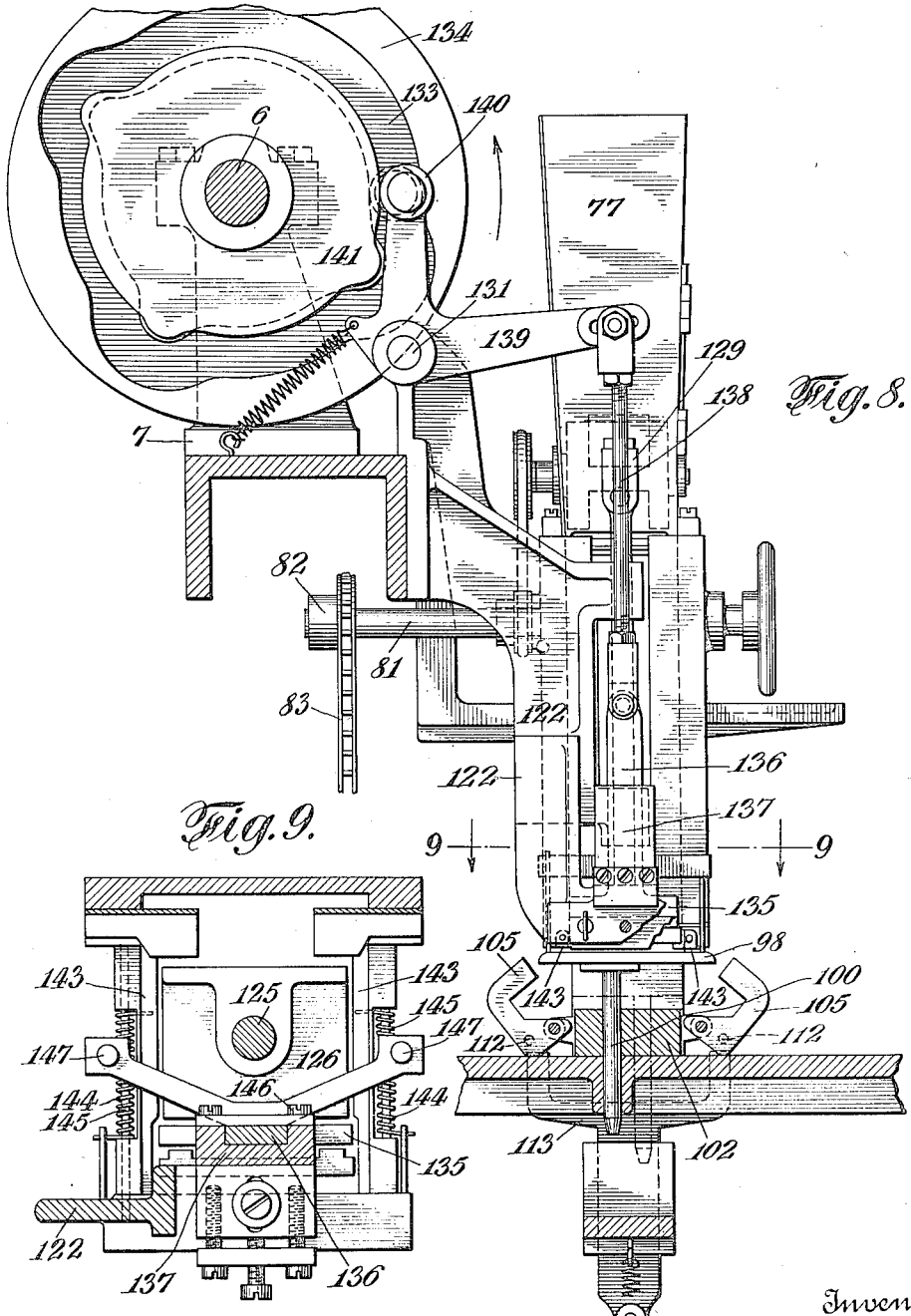

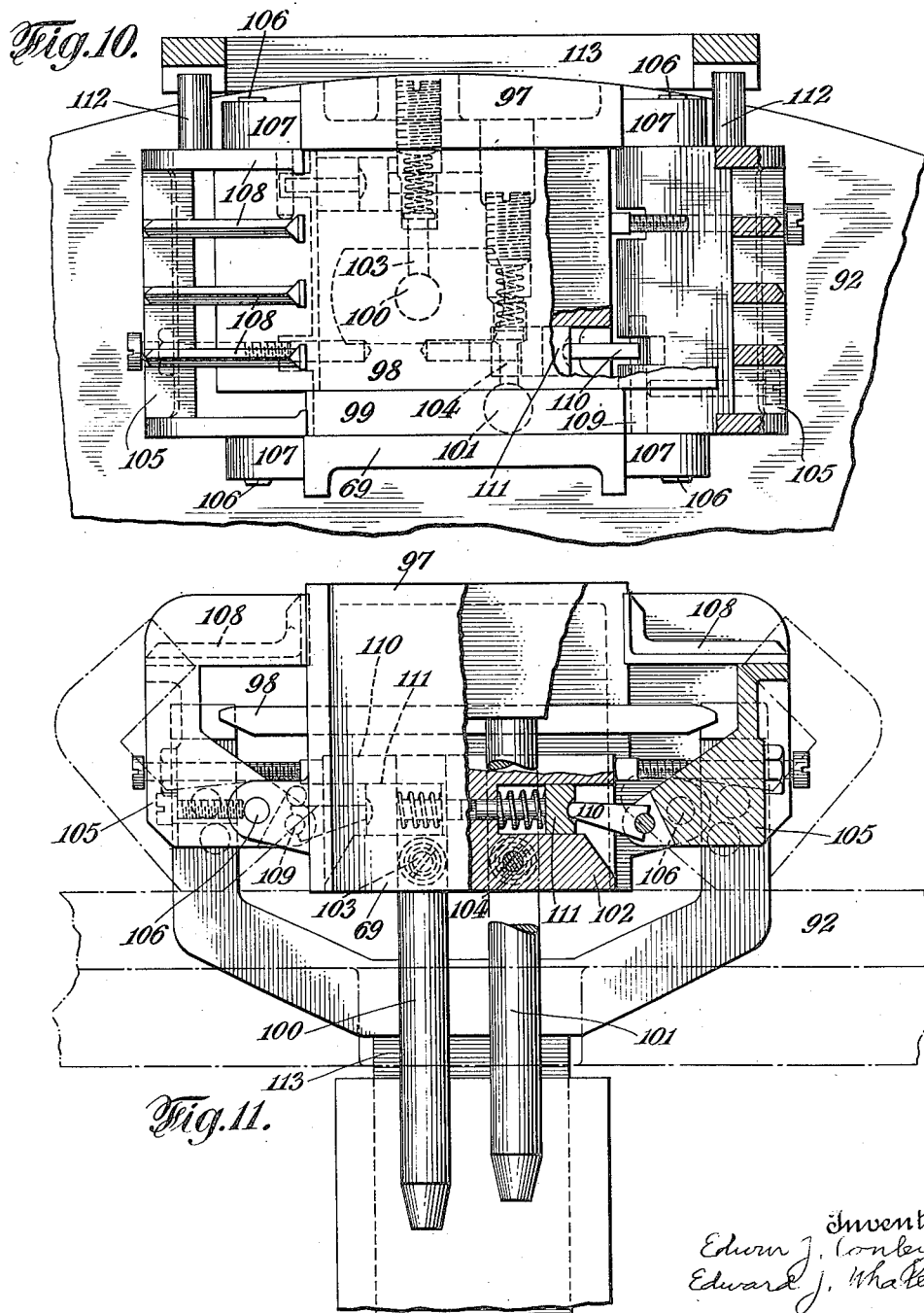

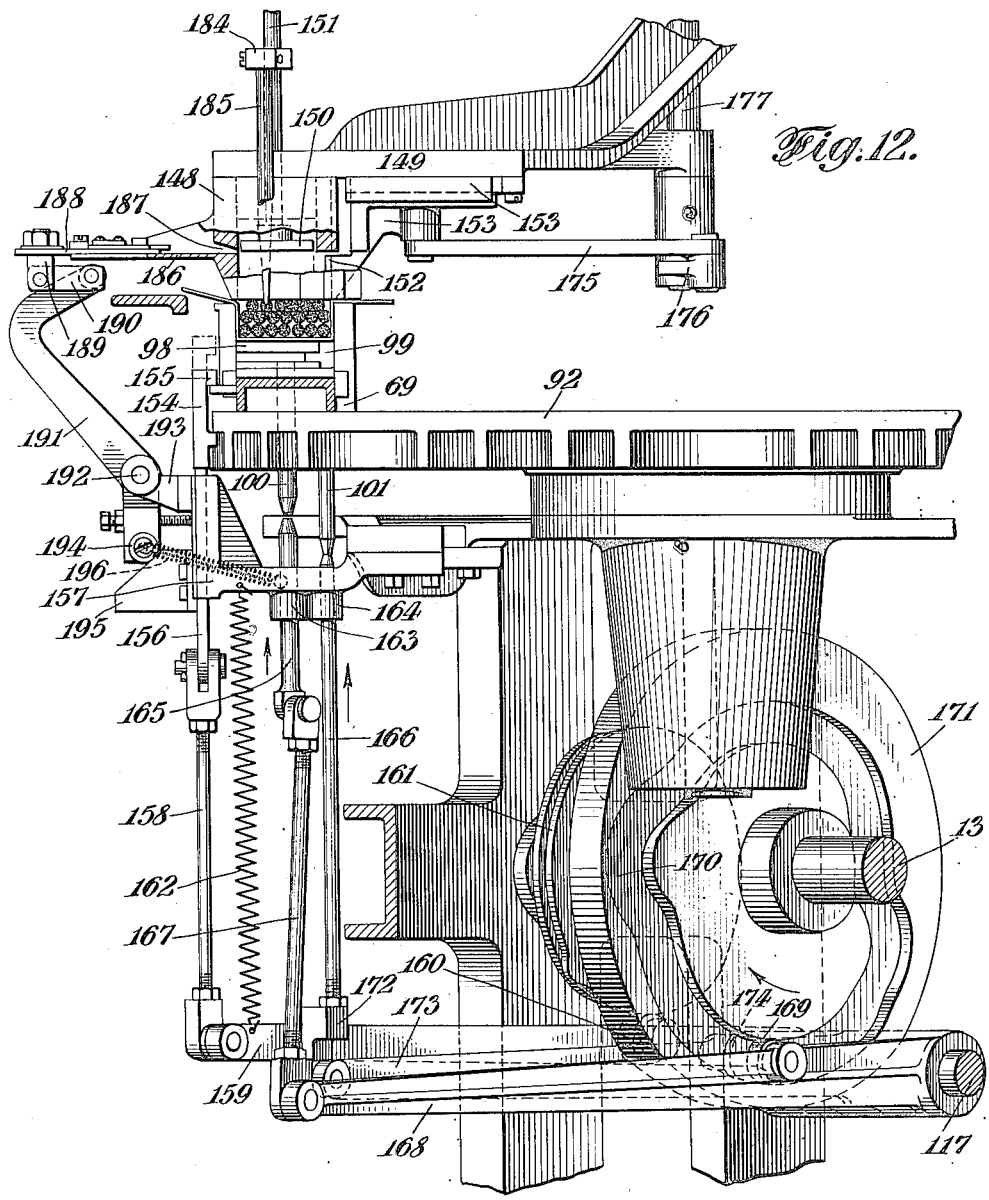

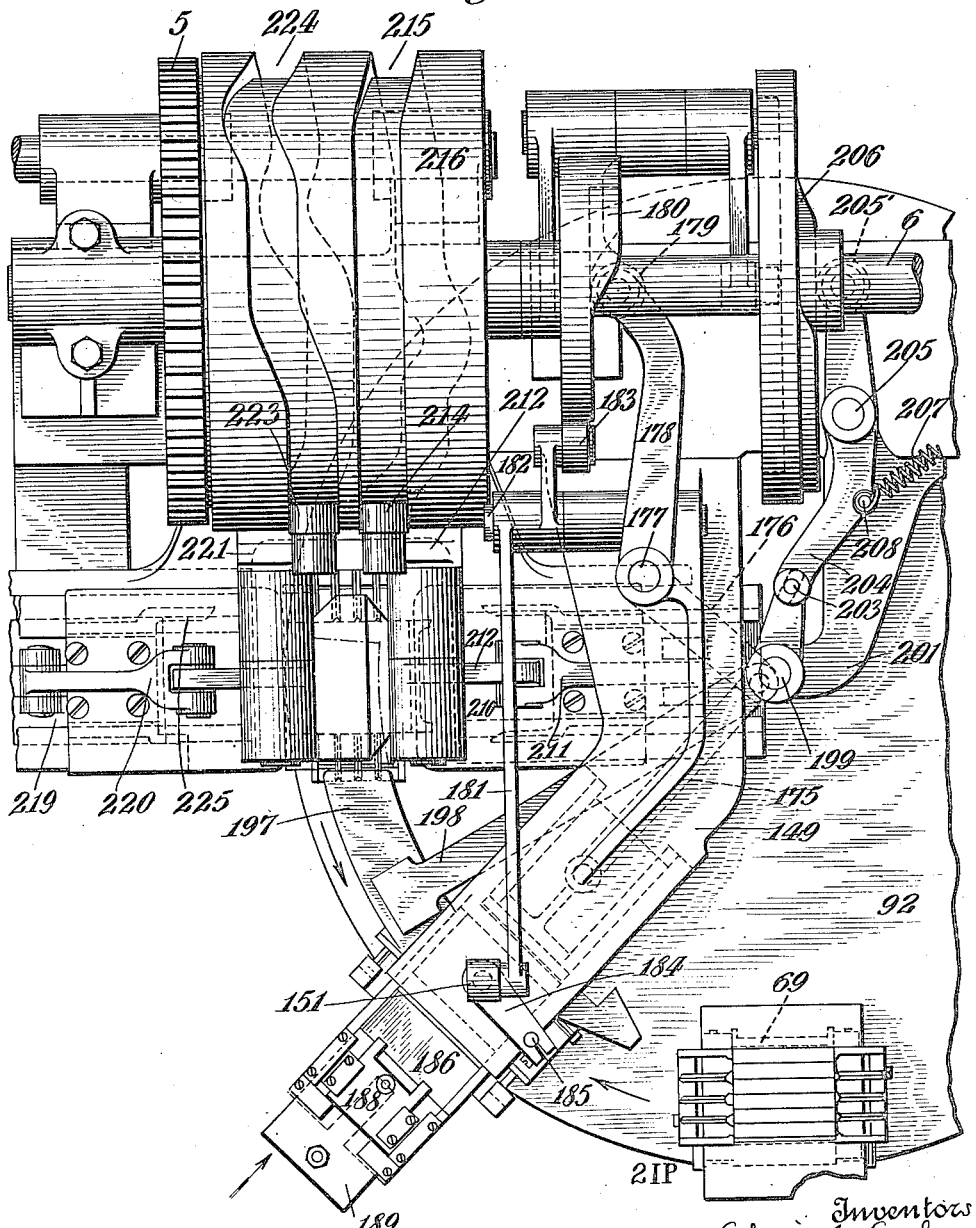

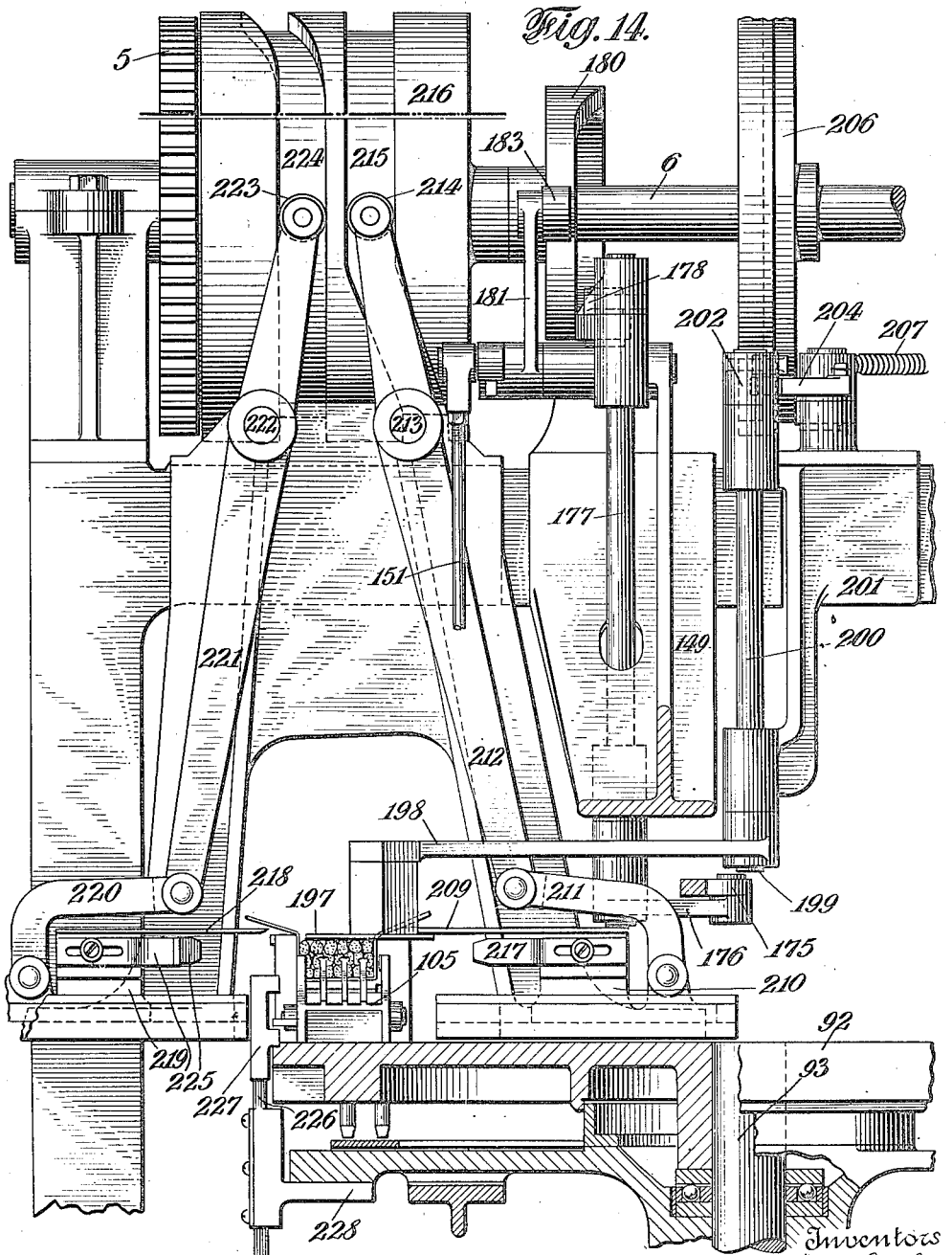

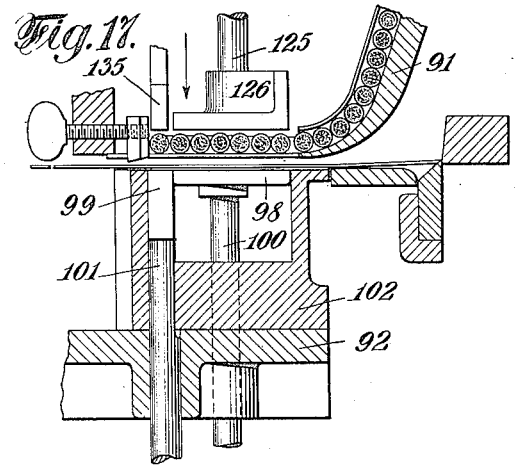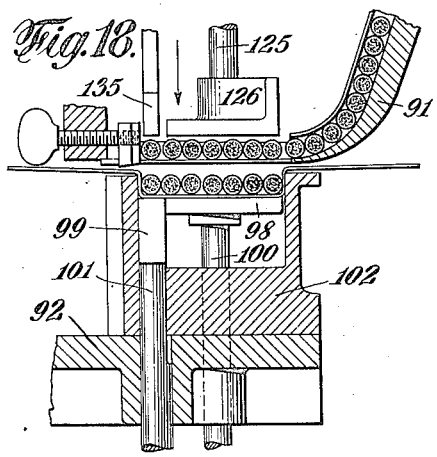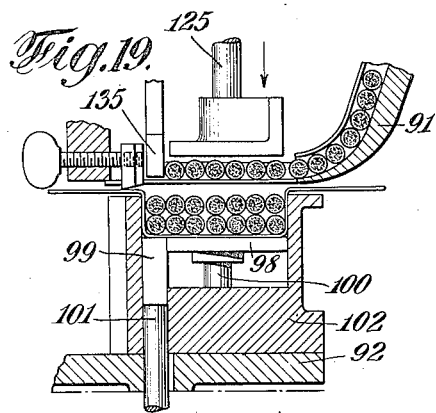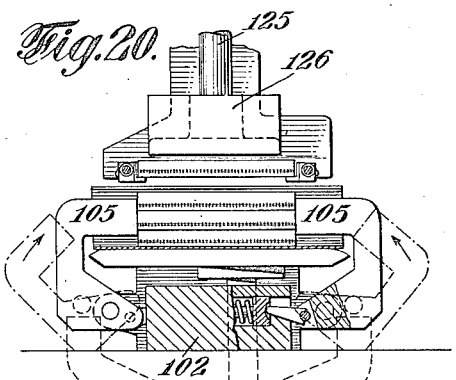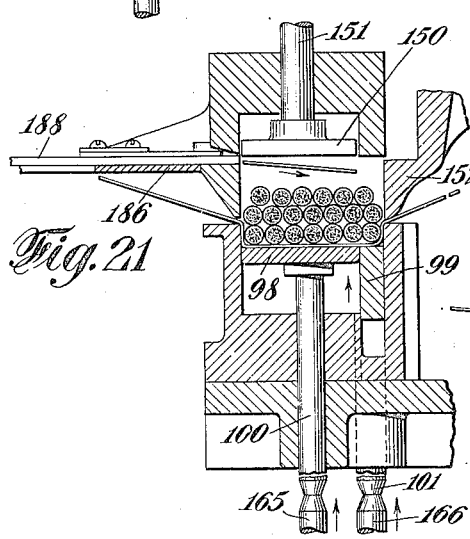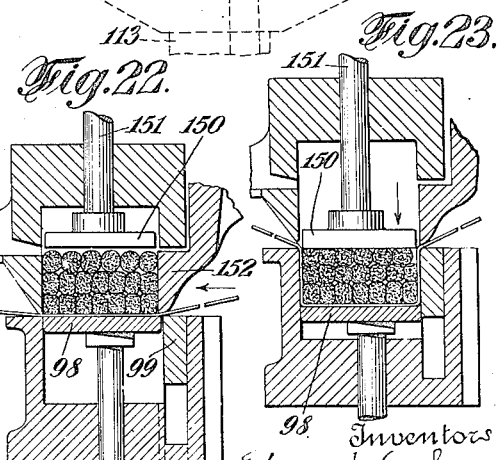

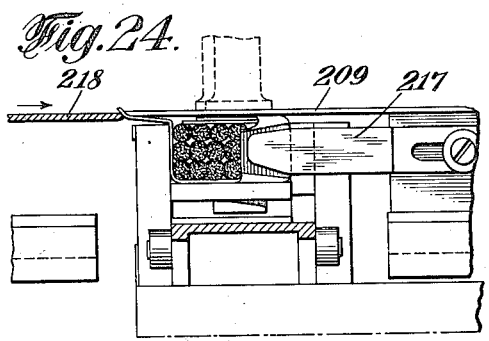
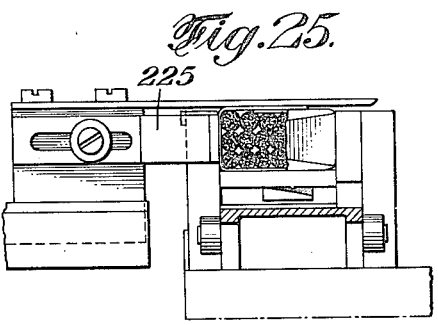
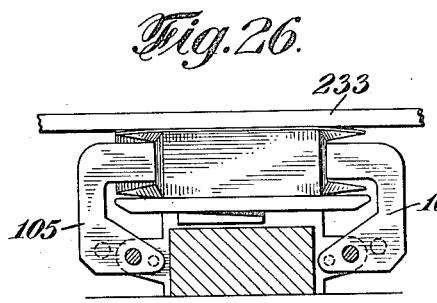
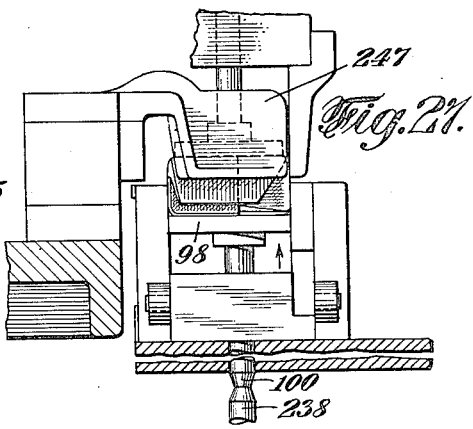
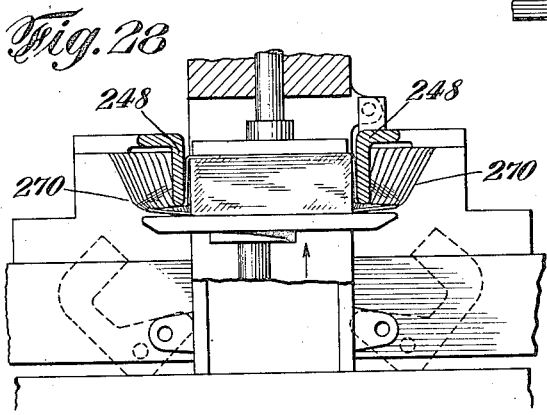
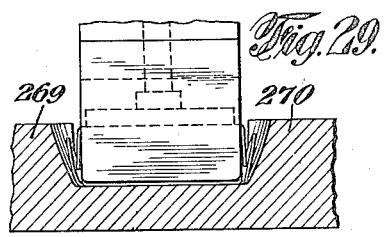

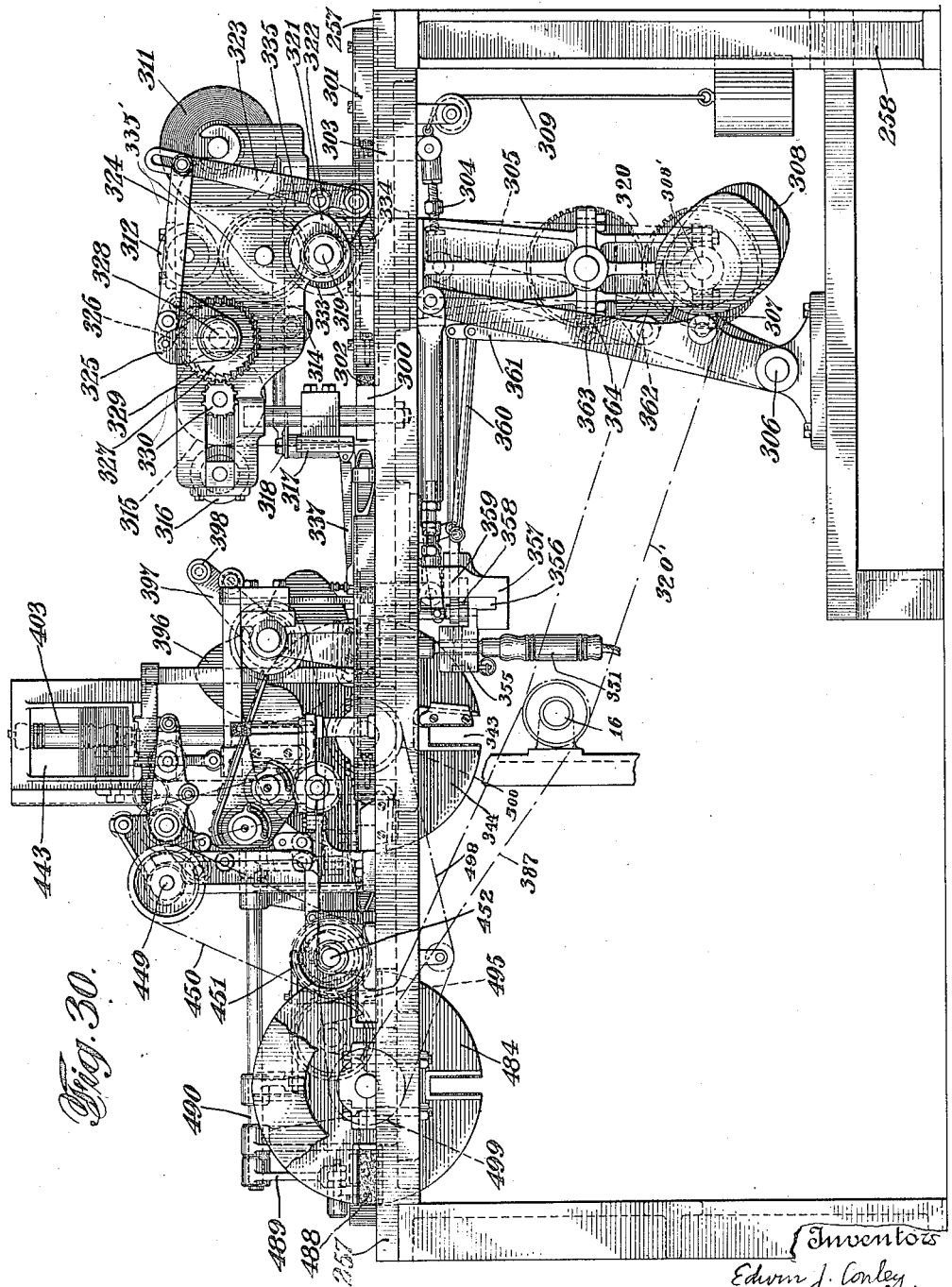

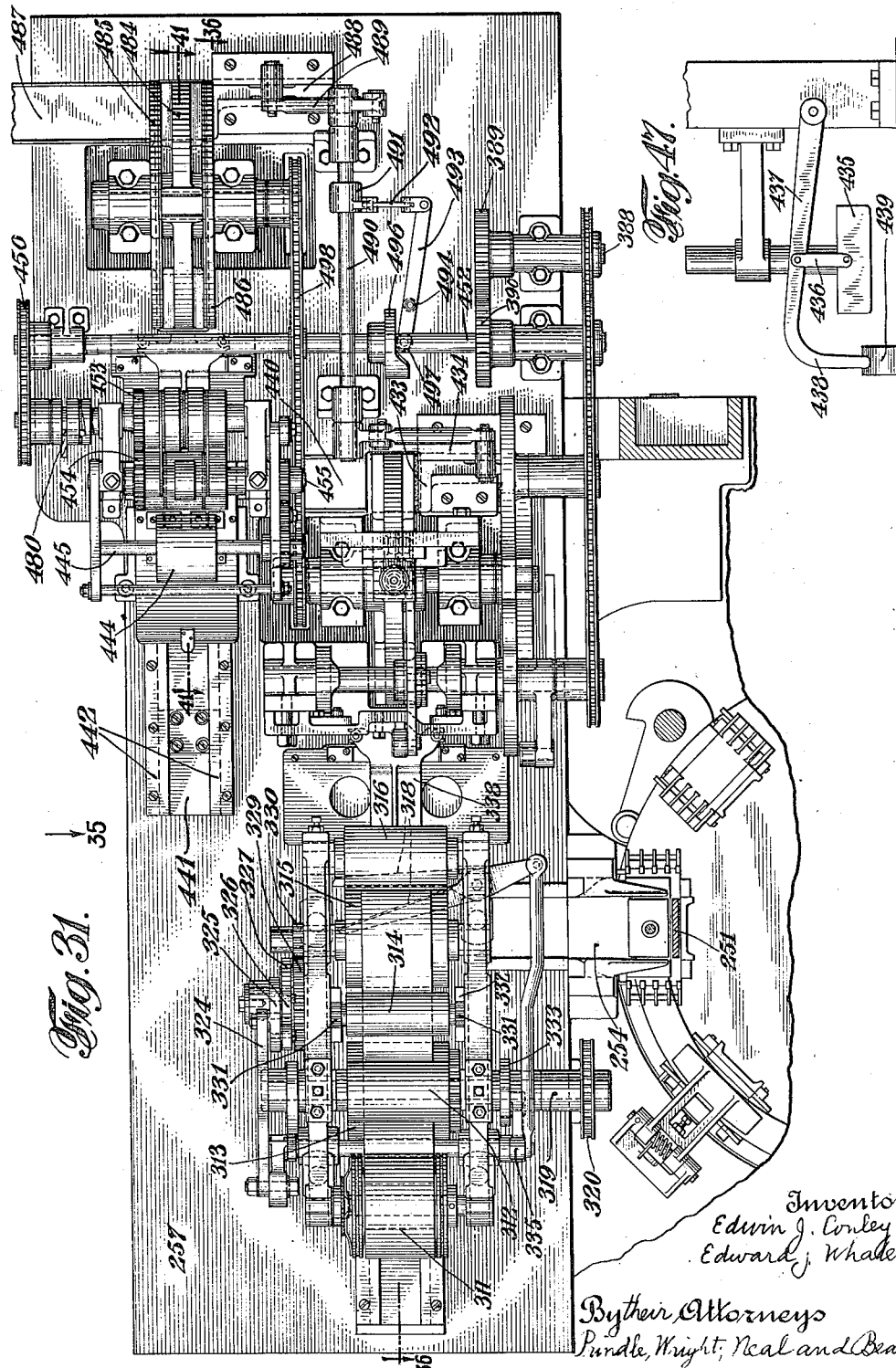

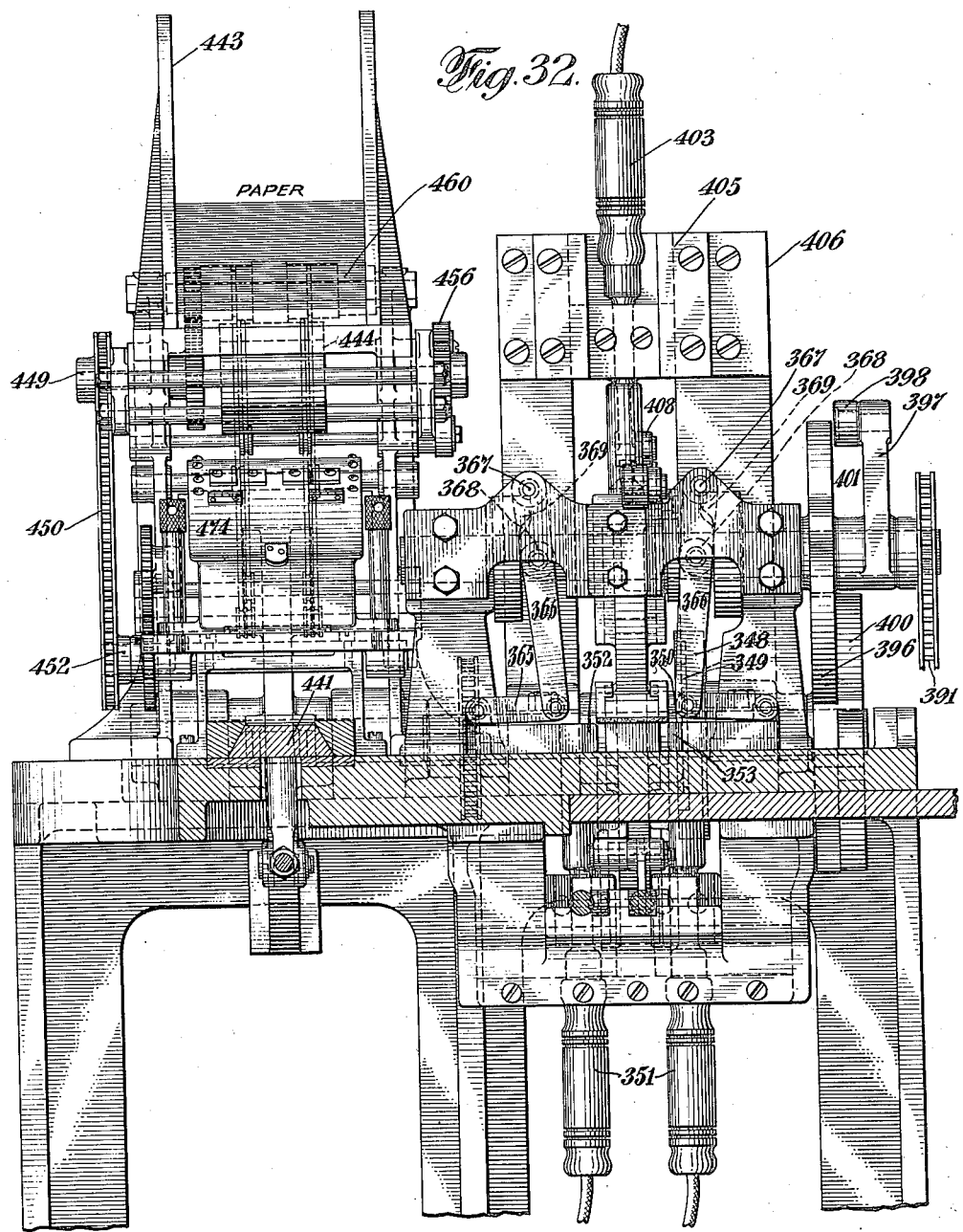

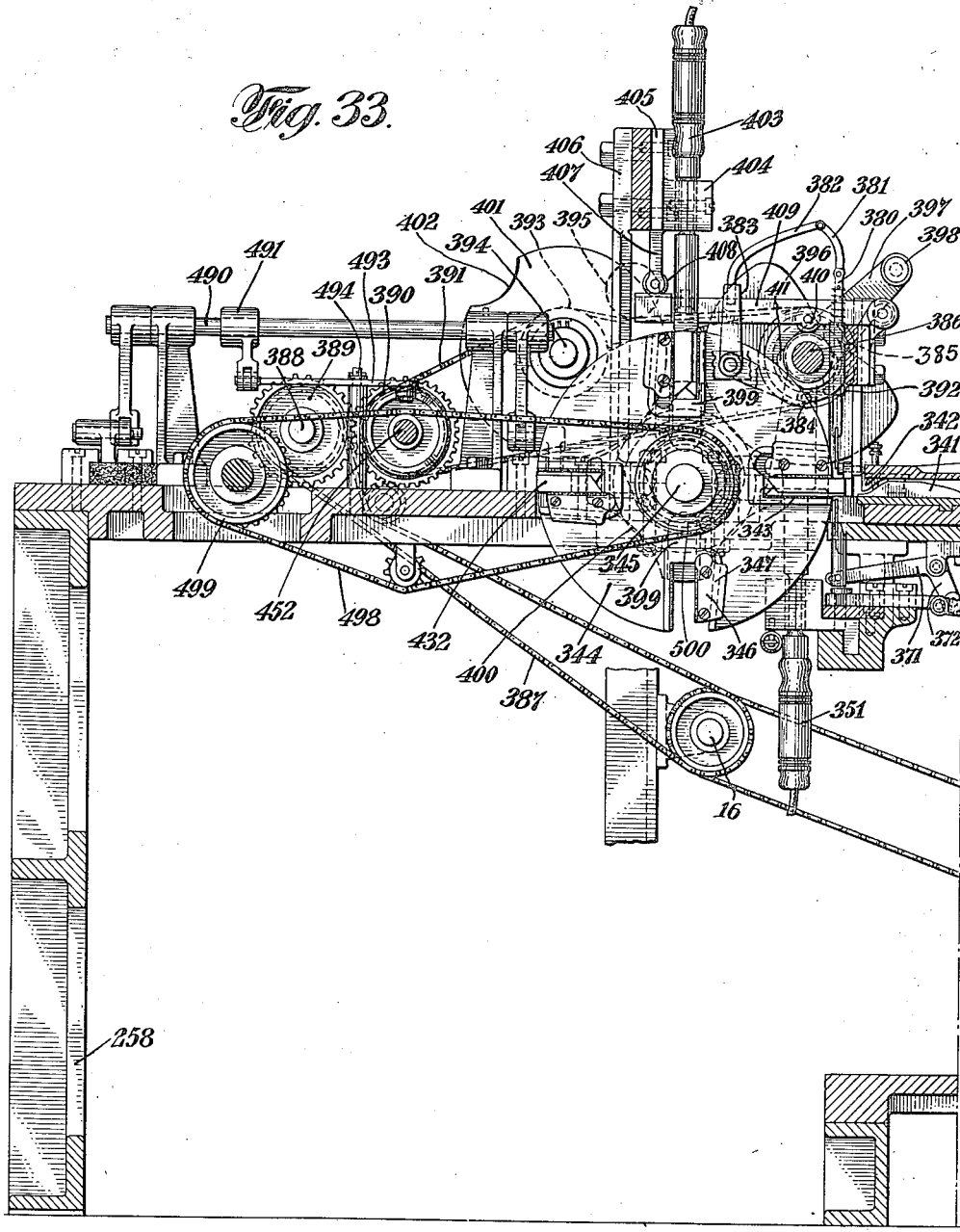

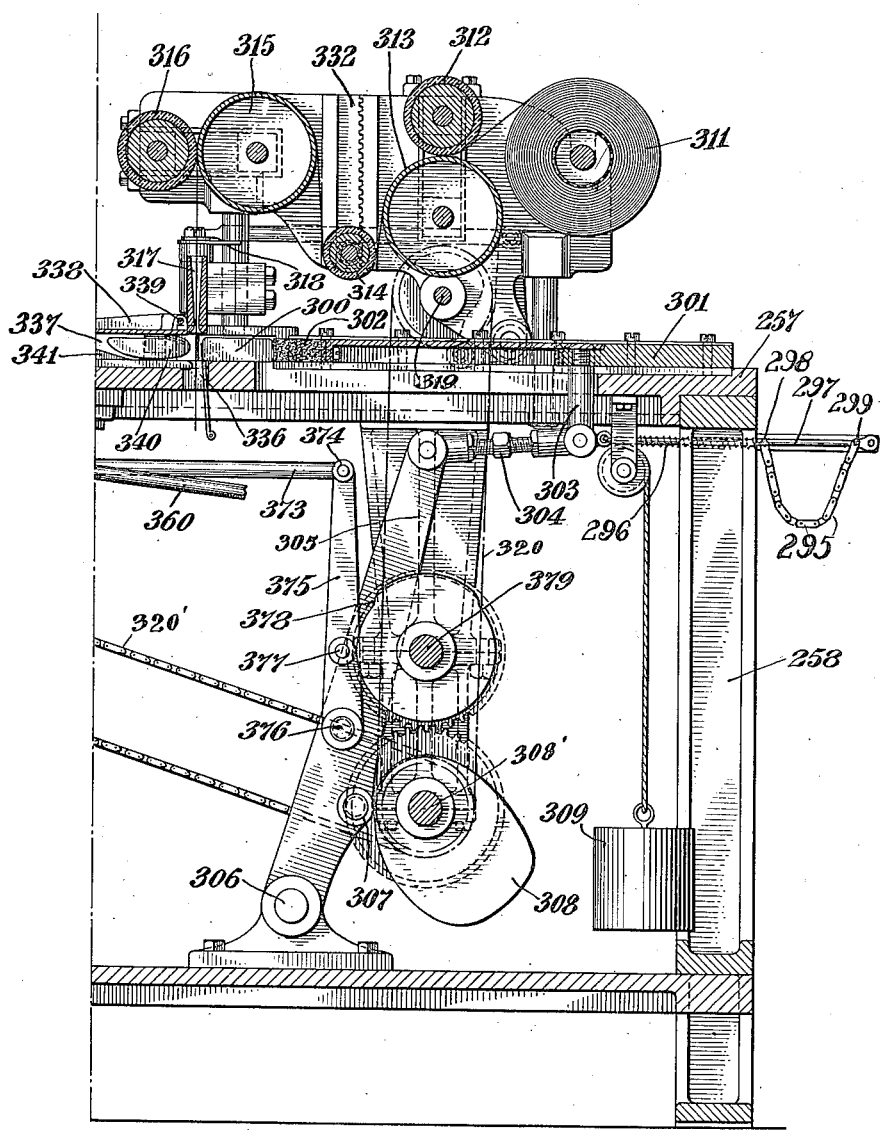

March 25, 1924.
E. J. CONLEY ET AL
1,487,840
MACHINE FOR FORMING SEALED FOIL PACKAGES
Filed Jan. 17, 1923
25 Sheets-Sheet 19

Inventors
Edwin J. Conley
Edward J. Whalen
By their Attorneys
Prindle, Wright, Neal and Bean.

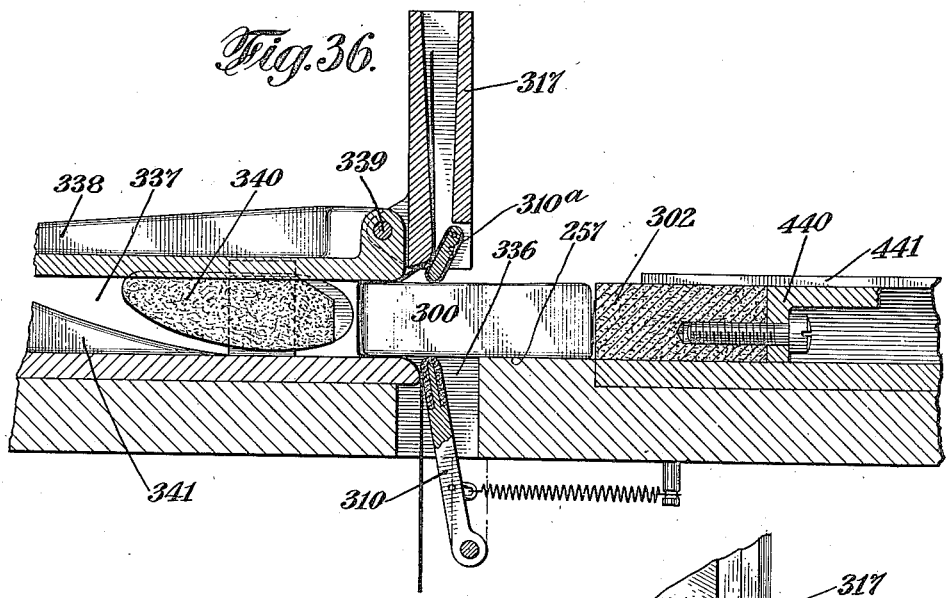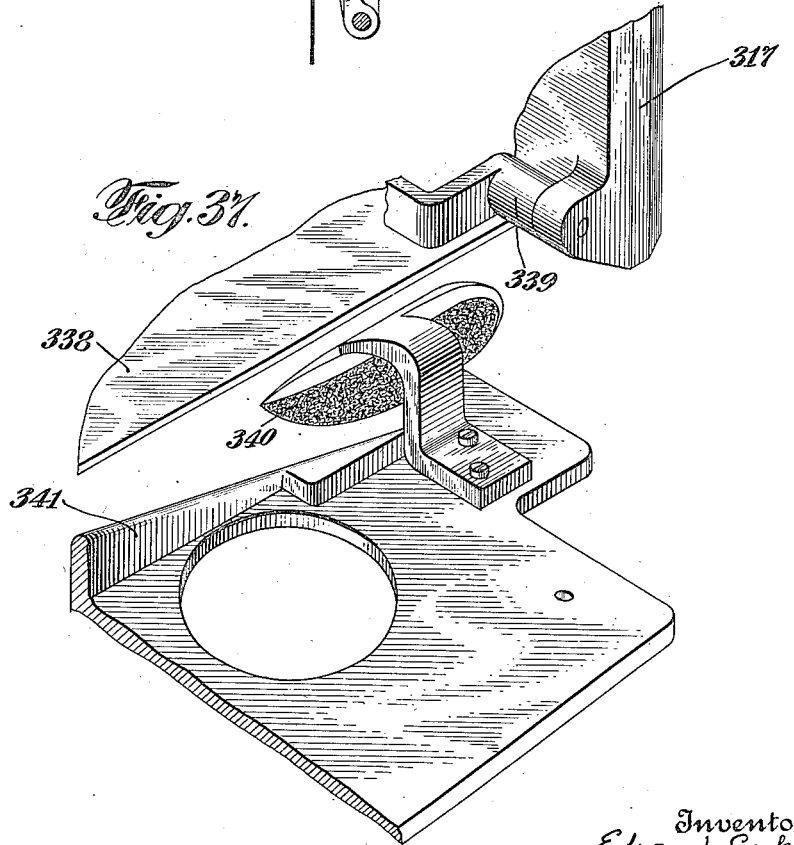

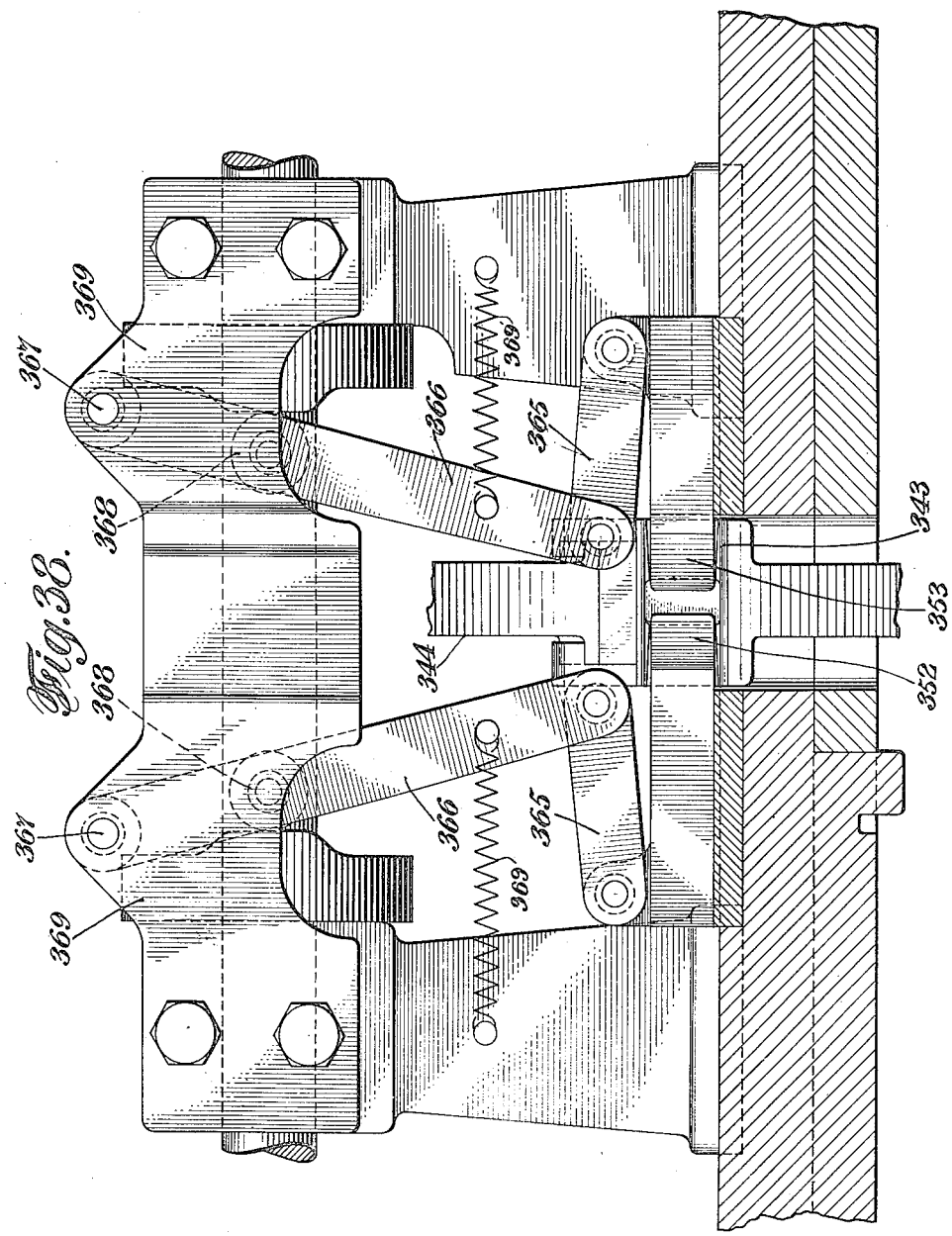

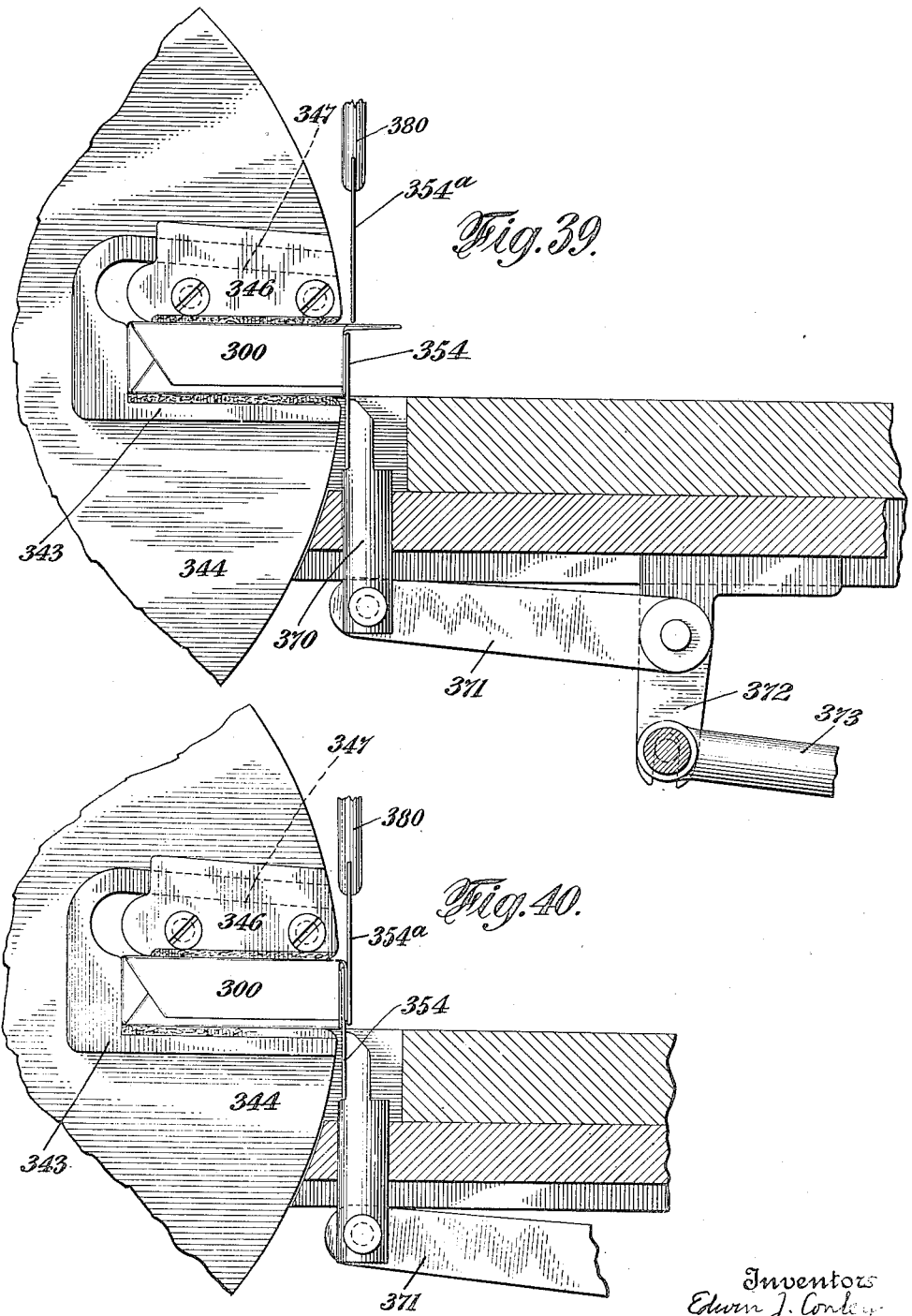

March 25, 1924.
E. J. CONLEY ET AL
1,487,840
MACHINE FOR FORMING SEALED FOIL PACKAGES
Filed Jan. 17, 1923   25 Sheets-Sheet 23
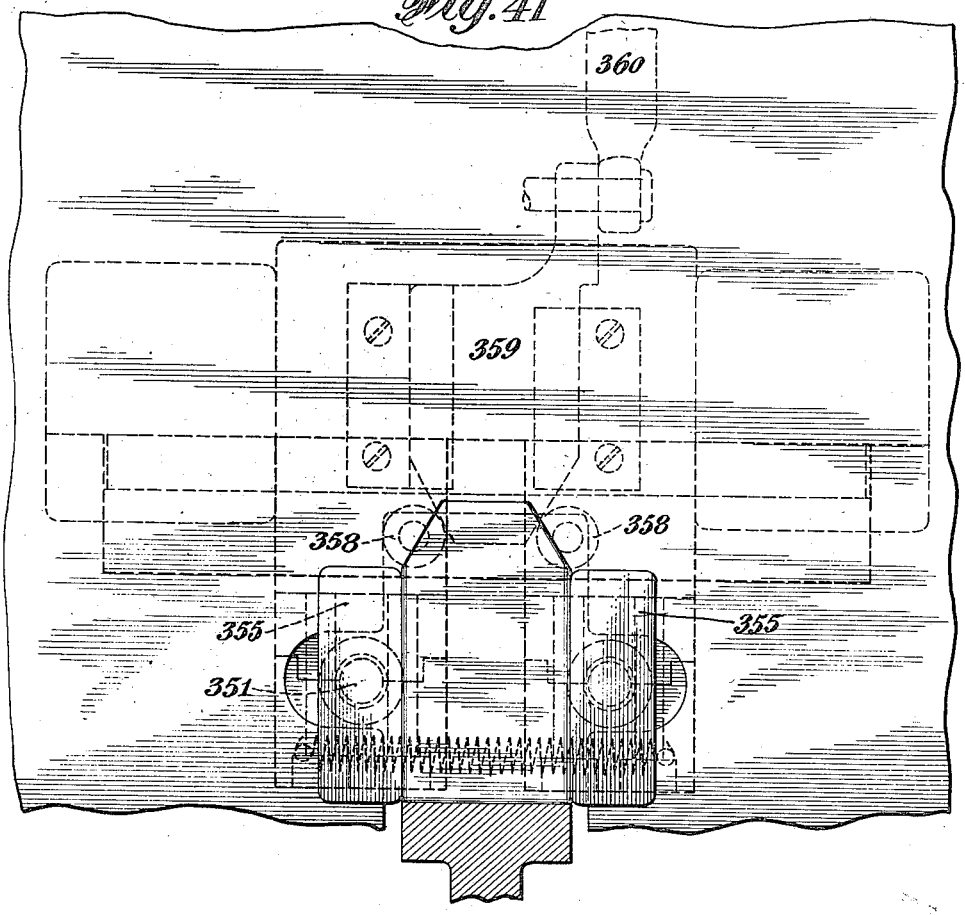
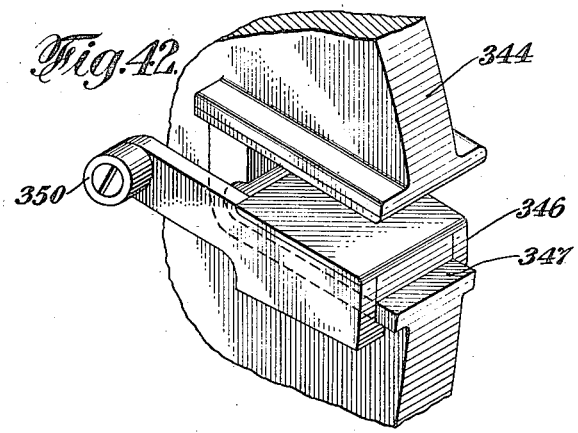
Inventors
Edwin J. Conley
Edward J. Whalen
By their Attorneys
Prindle, Wright, Neal and Bean

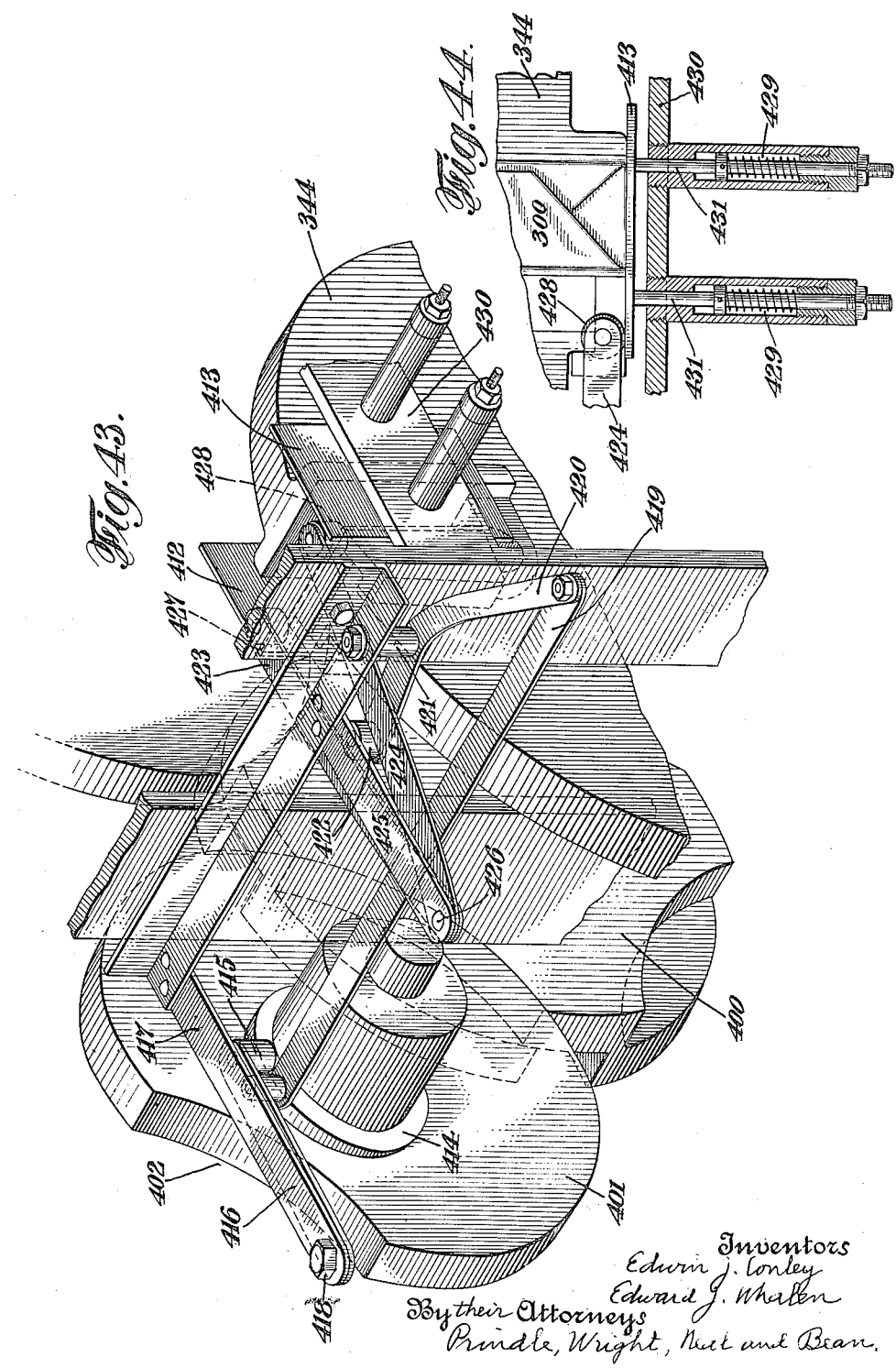

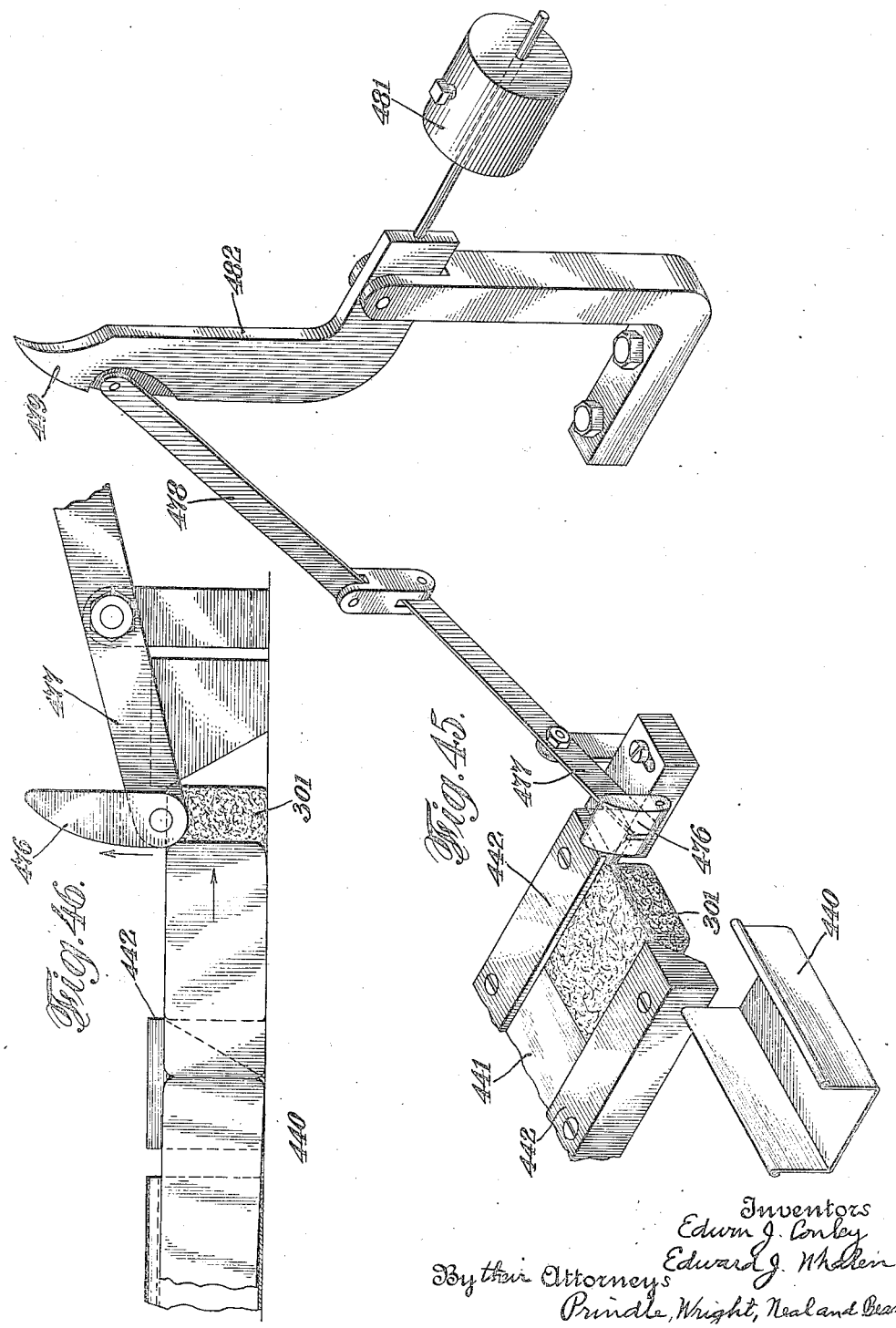

Patented Mar. 25, 1924.

1,487,840

UNITED STATES PATENT OFFICE.

EDWIN J. CONLEY, OF NEW YORK, AND EDWARD J. WHALEN, OF HOWARD BEACH, NEW YORK, ASSIGNORS TO THE CONLEY FOIL COMPANY, OF NEW YORK, N. Y., A CORPORATION OF NEW YORK.

MACHINE FOR FORMING SEALED FOIL PACKAGES.

Application filed January 17, 1923. Serial No. 613,234.

*To all whom it may concern:*

Be it known that we, EDWIN J. CONLEY, a citizen of the United States, and a resident of New York, county and State of New York, and EDWARD J. WHALEN, a citizen of the United States, a resident of Howard Beach, in the county of Queens and State of New York, have invented a certain new and useful Machine for Forming Sealed Foil Packages, of which the following is a specification.

This invention relates to a machine for wrapping cigarettes and the like, and more particularly to a machine in which cigarettes are enclosed in a paper wrapper, then hermetically enclosed in a foil wrapper, and preferably finally wrapped with a paper wrapper or pouch.

This invention has as an object the provision of a hermetically sealed foil package for cigarettes and the like. It has as another object the provision of means for wrapping cigarettes in paper without sealing the latter, and then hermetically enclosing it with a foil covering with or without a final paper covering. Another object of the invention is to perform the said initial paper wrapping operation in a rotatable turret in which the formation of end flaps overlying each other is completed as the package leaves the turret. A further object is to conduct the hermetic sealing operations within pockets in a rotatable dial and to so regulate the rotation of the dial that overthrow thereof will be prevented. Still another object is to provide a means for stopping the feeding of paper and foil during the wrapping operations whenever there is a failure to advance a package. Further objects of the invention will appear hereinafter.

The invention in its preferred embodiment is shown in the accompanying drawings which form part of this specification, and in said drawings Fig. 1 is a side elevation of a part of the machine comprising the turret mechanism, certain parts being broken away.

Fig. 2 is a plan view of the foil wrapping mechanism shown in combination with the said turret mechanism.

Fig. 3 is a detail side elevation of means employed for feeding a strip of wrapping material and cutting sheets therefrom.

Fig. 4 is a detail view of a form of brake used in certain parts of the machine, for preventing overthrow of certain moving parts of the machine.

Fig. 5 is a side elevation of the structure shown in Fig. 3.

Fig. 6 is a detail plan view showing the mechanism for supporting a reel which in turn supports a strip of wrapping material.

Fig. 7 is a detail view, partly in section, showing the source of cigarette supply and the mechanism for separating from said source a definite number of cigarettes.

Fig. 8 is a side elevation of the structure shown in Fig. 7, taken on the line 8 in Fig. 1.

Fig. 9 is a sectional view taken on the line 9—9 in Fig. 8.

Figures 10 and 11 are respectively fragmentary detail views of one of the pockets carried by the forwarding means for advancing cigarettes.

Fig. 12 is a detail view illustrating the mechanism for removing a plurality of cigarettes from the forwarding means into the means for collocatively compressing said cigarettes.

Fig. 13 is a plan view of the structure shown in Fig. 12 with operating parts added.

Fig. 14 is a front elevation of a portion of the mechanism for folding the sheet of wrapping material around the collocation of cigarettes while in the forwarding means.

Figures 15 and 16 are respectively side and rear elevations of the mechanism for transferring a collocation of cigarettes from the forwarding means or turret to the means for hermetically enclosing the paper-wrapped cigarettes with a sheet of foil.

Figures 17 to 26 show various operations of the machine for assembling the cigarettes, counting them, and wrapping them in a paper wrapper to finally provide extending end flaps, this extending end flap structure being shown in Fig. 26.

Fig. 27 shows the position of the package after having been moved upwardly and just before being ejected from the turret mechanism.

Fig. 28 shows an end view of the package with the means for folding the upper and lower flaps.

Fig. 29 shows the package as it is being advanced through the folding box wherein the lower flaps are folded up.

Fig. 30 is a side elevation of the mechanism for enclosing the package with foil after leaving the turret.

Fig. 31 is a plan view of this mechanism in combination with a portion of the turret.

Fig. 32 is an end view of this mechanism showing the paper pouch forming mechanism in elevation beside the dial mechanism.

Fig. 33 is a side elevation of the dial and dial actuating mechanism.

Fig. 34 is a side elevation of the foil feeding means in connection with related parts.

Fig. 36 is a view showing how the foil begins to fold about the package as the latter enters the folding box.

Fig. 37 is a detail view of parts of the folding box.

Fig. 38 is an elevation of the side tuckers positioned adjacent a dial pocket.

Fig. 39 is a view showing the package in the dial pocket and the first step in the operation of folding the end flaps.

Fig. 40 is a similar view showing the completion of the folding before the bottom tucker is withdrawn.

Fig. 41 is a plan view showing the means for actuating the fusing irons which fuse the overlapping edges of the foil at the sides of the package.

Fig. 42 is a detail view showing the construction of the movable wall of the pocket.

Fig. 43 is a perspective view of the dial and its related mechanism for preventing overthrow and for actuating the side plates at the uppermost pocket of the dial.

Fig. 44 is a detail view of the spring pressed plates shown in Fig. 43.

Fig. 45 is a perspective view showing the clutch actuating mechanism for preventing the feeding of a sheet of paper when the package is advanced along the celluloid channel.

Fig. 46 is a detail view showing the manner in which the advancing packages lift the end of the clutch actuating lever, and Fig. 47 shows the weight adjacent the dial for preventing backward movement of a package into the dial.

Figure 1:
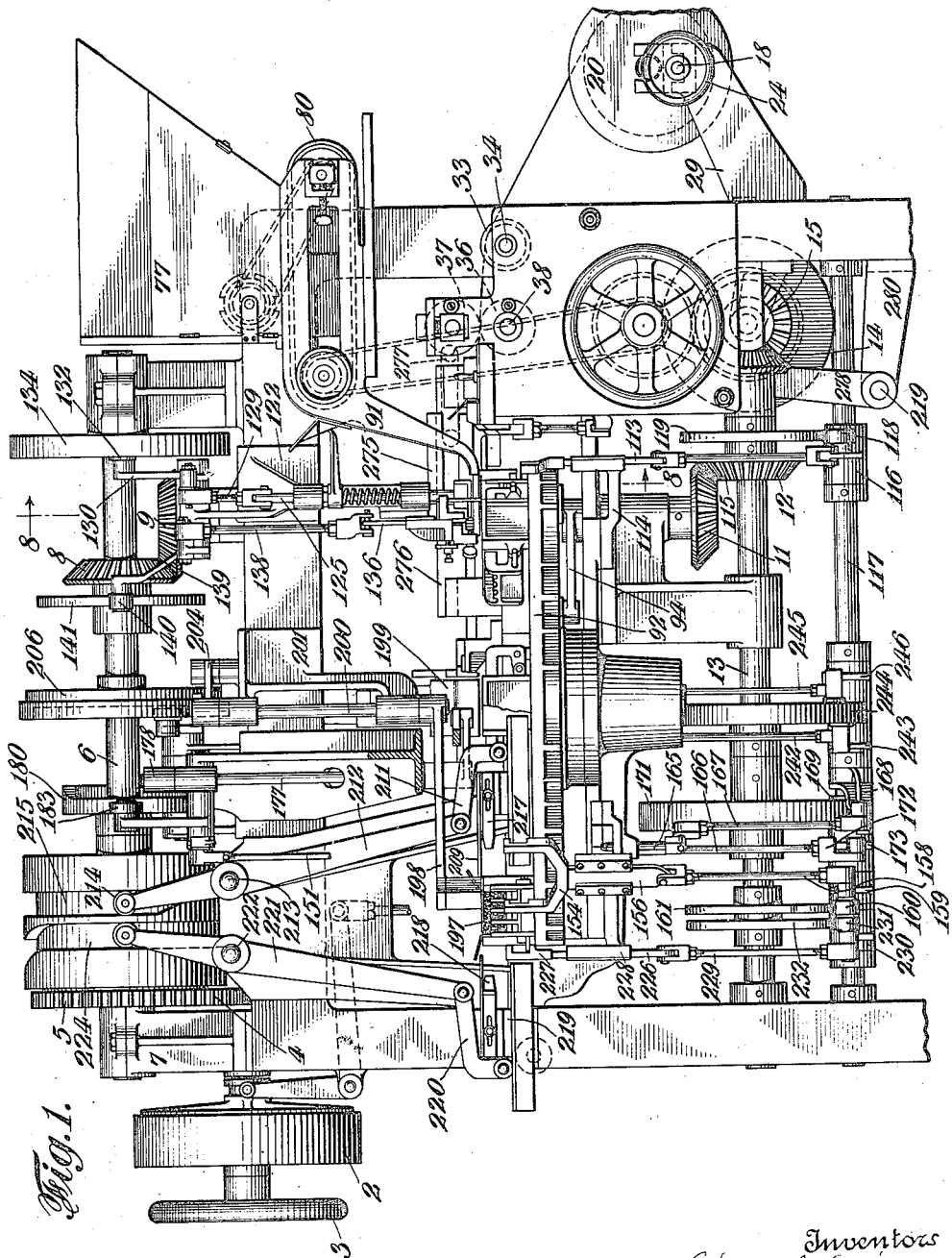

In the machine selected to illustrate the invention, 1 indicates the main frame of the machine built up in a manner well known to mechanics generally, and a detailed description thereof is therefore omitted in the interest of brevity. The main frame 1 supports a power shaft carrying a friction pulley 2 (see Fig. 1) and a hand wheel 3, by means of which the machine may be turned over by hand for adjusting or other purposes. The main power shaft carries a pinion 4 which is in mesh with a spur gear 5 fast upon a shaft 6 journaled in brackets 7 rising from the main frame of the machine. The shaft 6 carries a bevel gear 8 which is in mesh with a similar bevel gear 9, fast upon a vertical shaft 10 journaled in bearings in the main frame. The lower end of the shaft 10 carries a bevel gear 11 which is in mesh with a bevel gear 12 fast upon a shaft 13, which shaft is journaled in suitable bearings formed in the main frame. The shaft 13 carries a bevel gear 14 which is in mesh with another bevel gear 15 carried by a shaft 16 journaled in brackets 17 secured to the main frame of the machine (see Fig. 5). The shafts and gearing just described constitute the main driving elements of the machine.

There is provided a source of wrapping material supply which includes a reel for supporting a strip of wrapping material wound thereupon. The reel includes a shaft 18 (see Figs. 2, 3, 5, and 6), upon which is pinned a flange 19, and upon which is secured a flange 20. One end of the shaft 18 is reduced at 21 and the reduced end engages a collar 22, which collar is adjustable in the direction of the axis of the shaft 18 through the agency of a screw 23 and operating handle 24 of well-known construction. The purpose of this adjustment is to insure the proper alinement of the strip of wrapping material with the devices to which it is fed. The shaft 18, at a point adjacent the flange 19 carries an arm 25 adjustably clamped thereupon. This arm contacts with a bent lever 26 (see Fig. 3). The bent lever is fulcrumed at 27 to a bracket 28 extending to the left from the main bracket 29 which supports the shaft 18. The free end of the lever 26 is hooked to one end of a spring 30; the other end of the spring is hooked on a post 31 secured to the main frame of the machine. The extreme end of the shaft 18 opposite the operating wheel 24 rests in an open bearing 32. It will be readily understood that during the operation of the machine an exhausted reel may be lifted from its bearings and replaced by a full reel without disconnecting any of the parts heretofore described. It may be here remarked that two such reels are supplied with each machine so that while one is in use, the other may have a strip of wrapping material wound upon it through some outside agency. The strip of wrapping material is led from the reel over a guide pulley 33 on a shaft 34, which shaft is journaled in the main frame of the machine. From the guide pulley 33 the strip of wrapping material passes over a table 35 into the range of action of a pair of feed rollers 36—37. The feed roller 36 is fast upon a shaft 38 journaled in the main frame of the machine. This shaft 38 carries a spur gear 39 which is in mesh with an idle gear 40 loosely mounted upon a stud 41 secured to the main frame of the machine. The idle gear 40 is in mesh with a spur gear 42 loosely mounted upon a shaft 43, which shaft is journaled in suitable bearings in the main frame of the machine and which carries a spur gear 44 in mesh with a spur gear 45, the latter being fast upon the shaft 16 before referred to. The spur gear 39 is also in mesh with a spur gear 46, the spur gear 46 being fast upon a shaft 47, which carries the feed roller 37 before referred to. The shaft 47 is journaled in boxes 48, which boxes are spring pressed and slidably mounted in a well-known manner in uprights rising from the main frame of the machine. The hub of the spur gear 42 is provided with a ratchet 49, which ratchet is engaged by a pawl 50 mounted upon the lever 51, the lever being loosely mounted upon the shaft 43 adjacent the ratchet 49. The lever 51 is connected by means of a link 52 to a cam lever 53, which cam lever is fulcrumed at 54 to the main frame of the machine. The cam lever 53 carries a bowl 55 engaging a slot in a cam disk 56 fast upon the shaft 43 before referred to.

It will be readily understood that the mechanism just described operates to intermittently rotate the feed rollers 36 and 37 and thereby produce an intermittent feeding movement of the strip of wrapping material.

From the feed rollers 36 and 37 the strip of wrapping material passes over a table 57 and under a removable plate 58 to a shearing device operated to sever a sheet of wrapping material from the strip. This shearing device consists of a fixed plate 59 and an oscillating shear blade 60 which is fulcrumed at 61 to the frame of the machine. The shear blade 60 is connected by means of an adjustable link 62 to a bell-crank lever 63—64. The bell-crank lever is pivoted at 65 to a bracket 66 extending from the frame of the machine. The arm 64 of the bell-crank lever 63—64 carries a bowl 67 running upon the face of the cam 56 before referred to, and it is to be understood that this cam carries a projection timed to swing the shear blade 60 upwardly so that it can cooperate with the fixed blade 59 to cut the strip at the proper time. The bowl 67 is held to its duty by means of a spring 68, one end of which is fast to the main frame, and the other end is fast to the upper pivot of the connecting rod 62.

Before the cut is effected, the strip of wrapping material is projected by the feed rollers 36—37 beyond the shearing position and over the top of a pocket 69 in which cigarettes are afterward deposited.

Overthrow or excess movement of the ratchet operated spur gear 42 is prevented by a brake mechanism illustrated in Fig. 4. This brake mechanism includes an arm 70 having an elongated head in which is mounted a plunger 71, a spring 72 engaging said plunger, and a plug 73 for regulating the tension of the spring. The arm 70 is clamped at 74 to the main frame and the plunger end bears against the gear 42. Similar plunger brakes are applied to the feed rollers 36 and 37 at 75 and 76 respectively.

In the machine selected to illustrate the invention a plurality of cigarettes is placed upon the sheet of wrapping material which has been severed from the strip and is forwarded while resting upon said sheet of wrapping material. The cigarettes are placed upon the sheet of wrapping material automatically and to this end there is provided a source of cigarette supply which includes a hopper 77 for containing cigarettes in bulk. The bottom of the hopper is formed by a belt 78 running over pulleys 79—80. The pulley 79 is mounted upon a shaft 81 which carries a sprocket 82 over which runs a chain 83. The chain 83 runs over a sprocket 84 journaled upon the shaft 43 before referred to. The hub of this sprocket carries a ratchet 85 which is engaged by a spring pressed pawl 86 carried by the hub 87 of the gear 44 before referred to. In a normal operation of the machine the gear 44 continuously rotates and through the connections just described the belt 78 forming the bottom of the hopper 77 is also continuously operated. The function of the pawl and ratchet mechanism 85—86 is to permit of the belt 78 being operated temporarily by hand for the purpose of feeding down cigarettes at the beginning of a machine run. There is also provided within the hopper 77 an agitating wheel 88 of well-known construction which is driven by a belt 89 from a pulley 90 fast on the shaft of the pulley 80 over which the feed belt 78 runs. The belt 78 and agitator 88 cooperates to dispose cigarettes in a line upon the belt, and the belt 78 operates to feed this line of cigarettes forward into an inclined chute 91, which leads downwardly to a point adjacent the pocket 69 and immediately over the sheet of wrapping material fed forward to and over the pocket by the feed rollers 36 and 37 before described. The general construction of this cigarette feeding mechanism is old and well known in the art and a more detailed description thereof is omitted in the interest of brevity. It may be here remarked, however, that the cigarettes fall by gravity through the chute 91, the weight of the column of cigarettes being sufficient to drive a definite number across the pocket 69 into position to be rammed down into said pocket. The pocket 69 in the machine shown is one of eight like pockets symmetrically arranged around the periphery of a turret 92. This turret 92 is mounted upon a shaft 93 suitably supported in a vertical bearing formed on the machine frame, and the turret is rotated by means of an arm 94 mounted upon the shaft 10 before referred to. This arm carries a bowl 95 engaging slots 96 formed in the under side of the turret. This mechanism constitutes what is known as a Geneva movement, which needs no further description.

The turret pockets are all alike and therefore a description of one will serve as a description of all. Referring particularly to Figs. 10 and 11: Each pocket, generally indicated by the reference character 69, includes a rectangular casing 97, open at the top and at both sides and having a movable bottom. When, as in the case of the machine selected to illustrate the invention, twenty cigarettes are to be placed in each package, two rows of seven and one row of six, the movable bottom of each turret pocket is constructed of two plates numbered respectively 98 and 99. The plate 98 is fixed upon the upper end of a plunger 100, and the plate 99 is fixed upon the upper end of a plunger 101. These plungers are slidably mounted in a block 102 closing the lower part of the casing 97 below the movable plates 98 and 99. Spring pressed plunger brakes of the type shown in Fig. 4 are employed for the purpose of holding the plungers 100 and 101 in any position to which they may be moved. These plunger brakes are indicated in Figs. 10 and 11 by the reference characters 103 and 104, the brake 103 cooperating with the plunger 100 and the brake 104 cooperating with the plunger 101. For the purpose of retaining cigarettes placed in the pocket in longitudinal alinement, there are provided swinging gates 105 fulcrumed at 106 to bosses 107 extending from the sides of the casing 97 before referred to. These gates carry fingers 108 at their upper ends, the free ends of which contact with and aline cigarettes resting upon the plates 98 and 99 within the casing 97. During the operation of the machine, these gates are held open a part of the time, and closed a part of the time. To so hold them, each gate is provided with a stud 109 which engages one end of a toggle lever 110. The other end of the toggle lever engages a spring pressed block 111 suitably mounted in the block 102 before referred to. This stud, toggle lever and block constitute a toggle mechanism which automatically operates to hold the gate either in open or closed position in a well-known manner. Each of the gates is further provided with a stud 112 projecting beyond the periphery of the turret 92. In the position in which the pocket receives cigarettes, the gates lie in open position; that is, the position shown in broken lines in Fig. 11. As soon as the cigarettes are deposited in the pocket, the gates are closed. This result is effected by means of a yoke formed on the upper end of a bar 113 (see Figs. 3, 10, and 11), which is slidably mounted in a bracket 114 secured to the main frame of the machine.

The lower end of the bar 113 is pivotally connected with an adjustable link 115, which in turn is pivotally connected to a cam lever 116 mounted upon the bar 117 extending across the machine. The cam lever 116 carries a bowl 118 which tracks upon the periphery of a cam 119, which cam is fast upon the shaft 13 before referred to. One end of a spring 120 is secured to the bracket 114 and the other end is secured upon a stud 121 fast to the link 115. This spring operates to hold the bowl 118 against the periphery of the cam 119 and it is to be understood that the cam is shaped to permit the spring to act to push the bar 113 and its yoke upward immediately after the required number of cigarettes has been placed in the pocket; and it is further to be understood that immediately after this action takes place, the cam again returns the yoke and its connections to its normal position or that shown in Fig. 3.

When cigarettes are to be placed in the pocket, the plates 98 and 99 occupy the position in which they are shown in Fig. 3, and it is to be understood that they are held in this position by means of the brake plungers 103 and 104 before referred to.

Cigarettes descending the chute 91 are not delivered directly to the pocket, but are delivered to a counting mechanism or mechanism for separating from the source of supply a definite number of cigarettes and from this mechanism they are transferred to the pocket. The mechanism referred to includes a bracket 122 (see Figs. 7, 8, and 9) depending from the main frame of the machine. This bracket has two bosses 123—124, in which is mounted a plunger 125. The lower end of this plunger carries a plunger head 126 normally occupying the position shown in Fig. 7. Between the bearings 123 and 124 there is mounted an arm 127 fast to the plunger. The free end of this arm engages a spring 128, the free end of which projects into the chute 91 and holds up a portion of the cigarettes in the chute for the purpose of preventing too great a pressure upon the lowermost cigarettes lying in the chute. Coiled around the plunger 125 is a spring 128 which bears against the bearing 124 and the arm 127. The function of this spring is to hold the plunger and arm in its uppermost position, or that shown in Fig. 7. The upper end of the plunger is pivotally connected with an adjustable link 129, which in turn is pivoted to a cam lever 130

130. The cam lever 130 is loosely mounted upon a bar 131 suitably supported in the bracket 122 before referred to. The cam lever 130 carries a bowl 132 engaging a cam groove 133 formed in a cam disk 134 fast on the shaft 6 before referred to. Immediately to the left of the plunger head 126 is a narrow head 135 formed on a plunger bar 136 mounted to slide in a bracket 137 adjustably mounted on the bracket 122 before referred to. The lower side of the plunger head 135 normally lies in the same plane as the lower side of the plunger head 126. The upper end of the plunger bar 136 is pivotally connected with a link 138 which in turn is pivotally connected to a bell-crank cam lever 139 fulcrumed on the bar 131 before referred to. The bell-crank lever 139 carries a bowl 140 tracking on the periphery of a cam 141 fast on the shaft 6 before referred to.

The lower end of the bracket 122 carries an adjustable abutment 142 by means of which the number of cigarettes which can pass under the plunger heads 126 and 135 is determined. The lower end of the bracket 122 further carries two swinging gates 143 normally held in the positions shown in Figs. 8 and 9 by means of sensitive coiled springs 144 coiled around the pintles 145, upon which these gates are pivoted. The gates 143 are separated a sufficient distance to permit the cigarettes to pass along their upper surface and under the plunger heads 126 and 135. In the machine selected to illustrate the invention, when seven cigarettes have been projected along the gates 143 which support their ends, the cams 134 and 141 operate to move the plunger heads 126 and 135 downward to the pocket. During this action the cigarettes operate, first to open the gates 143 against the action of their sensitive springs and then to push the pocket plates 98 and 99 downward against the action of their respective brake plungers. The plunger heads 126 and 135 then return to their normal position and another line of cigarettes passes on the gates 143. The cams 134 and 141 then operate a second time to push the second line of cigarettes down into the pocket, which, of course, depresses the pocket plates 98 and 99 still more. After the second line of cigarettes has been deposited in the pocket, the plunger head 135 remains in its low position, but the plunger head 126 returns to its normal position. A third line of six cigarettes only is then projected by the weight of the cigarettes in the chute 91 on the gates 143. The cam 134 then operates to push the plunger head 126 downward, thus forcing the third line of six cigarettes down upon the two lines of seven previously placed in the pocket. Both plunger heads are then returned to normal position and clear of the pocket so that the turret may be rotated to forward the cigarettes lying in the pocket.

The operation of that part of the machine just described is clearly illustrated in Figs. 17 to 20 inclusive. In Fig. 17, one line of seven cigarettes has been projected by gravity into position for insertion in one of the pockets 69. In Fig. 18, this first line of seven cigarettes has been deposited in the pocket and the plungers 126 and 135 have been returned to their normal position and a second line of seven cigarettes has been projected into position to be inserted in the pocket. In Fig. 19, the second line of cigarettes has been deposited in the pocket and the plunger 126 has been returned to its normal position, while the plunger 135 has been only partially retracted so that only six cigarettes can be projected into position for insertion in the pocket. Fig. 20 illustrates the action of the gates after the full twenty cigarettes have been inserted in the pocket, the gates being swung up into position for alining the cigarettes endwise.

It may sometimes happen that there are not enough cigarettes in the chute 91 to fill a pocket and in such case, the pocket plates 98 and 99 would not be pushed down to their lowermost position. To prevent breakage of parts in such case, the plunger bar 136 carries the yoke 146 provided with two pins 147, the function of these pins being to push the pocket plate down to its lowermost position only when the pocket is not filled with cigarettes.

As soon as the full number of cigarettes has been deposited in a pocket adjacent the source of cigarette supply, the turret 92 is given a movement which brings the pocket into the position, indicated at IP in Fig. 2. In this position the cigarettes are exposed for inspection and if the pocket contains a defective cigarette, the operator removes the same and replaces it by a perfect cigarette. From this position the turret is again given a movement which brings the pocket into the position indicated at 2 IP in Fig. 2, the second inspection position, where it again comes to rest. It is obvious that the operator may remove defective cigarettes and substitute perfect ones in either of these two inspection positions, or may remove the defective cigarettes in the first inspection and substitute a perfect cigarette in the second inspection position. From the second inspection position the pocket is carried by a further movement of the turret to a compressing position indicated at CP in Fig. 2. When any pocket containing the required number of cigarettes reaches the compressing position, the cigarettes are removed from the pocket, collocatively compressed and then returned to the pocket. In the device selected to illustrate the invention, this operation is accomplished by the following mechanism: Located immediately over a turret pocket, when the same is in the compressing position (see Fig. 12), is a rectangular casing 148 secured to a bracket 149, which bracket is supported from the main frame of the machine. Within this casing is mounted a plate 150 secured to the lower end of a plunger 151. The plate 150 normally occupies the position shown in Fig. 12. The lower part of the inner side wall of the rectangular casing 148 is cut away and in the opening thus formed is located a plunger or movable wall 152 carried by a slide 153 mounted in ways 153' secured to the bracket 149. This plunger 152 normally occupies the position shown in Fig. 12. Before the cigarettes can be removed from the pocket 69, the swinging gates 105 are opened or thrown back out of contact with the ends of the cigarettes. This movement is effected by the following mechanism: Located adjacent the periphery of the turret 92 at the compressing position is a yoke 154 having ledges 155 which normally overlie the path of movement of the studs 112 secured to the gates 105. As the turret rotates, these studs pass under the ledges 155. The yoke 154 is secured to a slide 156 mounted in a bracket 157 secured to the main frame of the machine. The slide 156 is connected by means of a link 158 with a cam lever 159. This cam lever is fulcrumed on the bar 117 before referred to (see Fig. 1). This cam lever carries a bowl 160 tracking on the periphery of a cam 161 fast on the shaft 13 before referred to. The cam 161 is shaped to produce a downward movement of the yoke 154 immediately after a pocket containing the required number of cigarettes reaches the compressing position; and a spring 162, which connects the cam lever 159 with the bracket 157, operates to hold the bowl 160 to its duty and to return the yoke 154 to its normal position.

After the gates have been opened, the cigarettes are to be removed from the pocket and compressed. The bracket 157 has bearings 163 and 164, through which respectively work plungers 165 and 166. The plunger 165 is connected by means of a link 167 to a cam lever 168 fulcrumed on the bar 117 before referred to. The lever 168 carries a bowl 169 tracking in a groove 170 formed in a cam wheel 171 which is fast on the shaft 13. Similarly, the plunger 166 is connected by means of a short link 172 to a cam lever 173 also fulcrumed on the bar 117. The cam lever 173 carries a bowl 174 tracking in a suitable groove in the side of the cam wheel 171 opposite that carrying the groove 170. The upper end of the plunger 165 lies immediately under the lower end of the plunger 100 of the pocket only when the latter is in compressing position. Similarly, the upper end of the plunger 166 lies immediately below the lower end of the plunger 101 of the pocket only when the latter is in compressing position. The cam 171 produces a simultaneous upward movement of the plungers 165 and 166 which in turn produces a simultaneous upward movement of the pocket plungers 100 and 101. This action is clearly shown in Fig. 21, which diagrammatically illustrates the transferring or removing action. In Fig. 21, however, the plungers 100 and 101 have not reached the extreme upper limit of their movement. This extreme upper limit of their movement is shown in Fig. 22. By reference to Figs. 21 and 22, it will be readily seen that as the cigarettes are removed from the pocket, the sheet of wrapping material upon which they rest is straightened out.

As soon as the plungers 100 and 101 reach their uppermost position, the plunger 152 is moved inwardly, as is clearly shown in Fig. 22. This movement is produced by the following mechanism: The slide 153 is connected by means of a link 175 to an arm 176 fixed upon the lower end of a short shaft 177. This shaft is journaled in suitable bearings in the bracket 149 before referred to. The upper end of the shaft carries an arm 178, the free end of which carries a bowl 179 tracking on the side of a cam 180 fixed upon the shaft 6 before referred to. The cam 180 is shaped to move the plunger 152 from the position shown in Fig. 21 to the position shown in Fig. 22, and to hold it there until the plate 150 carried by the plunger 151 has finished its operation.

The plunger 151 is pivoted to a cam lever 181 (see Fig. 13), which is fulcrumed on the stud 182 suitably supported in the bracket 149. The lever 181 carries a bowl 183 tracking on the periphery of the cam 180 before referred to. As soon as the cigarettes are compressed sidewise, as shown in Fig. 22, the plunger 151 and the plate 150 move downward, as indicated in Fig. 23, to return the cigarettes now collocatively arranged to the pocket. By an inspection of Figs. 22 and 23, it will be seen that, during this action, only the pocket plate 98 is moved downward, the plate 99 remaining in its uppermost position to form the side wall of the pocket now reduced in size.

The plunger 151 carries an arm 184 to which is clamped a pin 185, the function of this pin being to force the plate 98 downward in the event of the machine running without the required number of cigarettes in the pocket.

It is sometimes desired to insert in the package of cigarettes a card or coupon and the machine selected to illustrate the invention is provided with mechanism for performing this function. This mechanism comes into operation while a pocket is in the compressing position and just before the cigarettes are removed from the pocket to the compressing mechanism. With this end in view, there is provided a table 186 (see Figs. 12 and 13), projecting outwardly from the casing 148 before referred to. Flush with this table is an opening 187 formed in the outer wall of the casing 148. Mounted upon the table 186 is a slide 188 free to move toward and away from the opening 187. This slide carries a stud 189 which is pivoted to a link 190. This link is also pivoted to a cam lever 191 fulcrumed at 192 to a bracket 193 supported by the bracket 157 before referred to. The cam lever 192 carries a bowl 194 running on a cam plate 195 screwed to the slide 156 before referred to. It will be readily understood that as the slide 156 is moved upward it operates the cam lever 191 and the slide 188 to push a coupon or card lying on the table 186 through the opening 187 to the interior of the casing 148, as is clearly shown in Fig. 23. For the purpose of returning the slide 188 to its normal position, or that shown in Fig. 12, there is provided a spring 196, one end of which is fast to the lever 191 and the other end to the bracket 157.

After the cigarettes have been collocatively compressed and returned to the turret pocket, with or without a card or coupon lying thereupon the turret is given another movement which brings the cigarettes and the sheet of wrapping material into position for folding the sheet of wrapping material around the cigarettes. While the cigarettes in the pocket are moving from the compressing position to the first folding position, they pass under a plate 197 which is fast upon an arm 198 fulcrumed at 199 on a vertical shaft 200, which shaft is mounted in suitable bearings formed in a bracket 201 secured to the main frame of the machine. The upper end of the shaft 200 is provided with an arm 202 carrying a stud 203 which engages a slot in one end of a cam lever 204. This cam lever is fulcrumed on a stud 205 suitably mounted in the bracket 201. The other end of the lever 204 carries a bowl 205' tracking on the side of a cam 206 fast on the shaft 6 before referred to. A spring 207 is provided, one end of which is hooked over a stud 208 carried by the cam lever 204; and the other end of the spring is secured to a fixed post, not shown but mounted on the main frame of the machine. This spring serves to keep the bowl 205' in contact with the cam 206 and to cause the plate 197 to travel with the pocket containing the collocatively compressed cigarettes to the first folding position. This cam 206 is so formed as to return the plate 197 to its normal position, or that shown in Fig. 13, at the proper time.

The mechanism for making the first folds of the sheet of wrapping material about the collocated cigarettes is illustrated in Figs. 1, 13, and 14. As the cigarettes come to the first folding position, they and the sheet of wrapping material lie in the position shown in Fig. 14. The inner flap is first folded over the cigarette. This is accomplished by means of a folding plate 209 fast upon a slide 210 mounted in ways carried by the main frame of the machine immediately over the turret. The slide is pivotally connected by means of a link 211 to a cam lever 212 fulcrumed at 213 on a stud suitably supported in the frame of the machine. The other end of the lever 212 carries a bowl 214 tracking in a groove 215 formed in the periphery of a cam drum 216 fast on the shaft 6 before referred to. This groove is shaped to produce a movement of the slide 210 and folding plate 209 across the pocket before the plate 197 is returned to its normal position. This movement folds one side of the sheet of wrapping material over the top of the cigarettes lying in the pocket. The slide 210 further carries folding plates 217 which fold in the inner ends of the wrapping material as shown diagrammatically in Fig. 24.

Opposite the cam plate 209 and beyond the turret 92 is a cooperating folding plate 218 which is carried by a slide 219 suitably supported in ways formed in the main frame of the machine. This slide 219 is connected by means of a link 220 to a cam lever 221 fulcrumed at 222 to a stud supported by the frame of the machine. The lever 221 carries a bowl 223 tracking in the cam groove 224 formed in the cam drum 216 before referred to. This slide 219 further carries a folding plate 225 similar in construction and operation to the plates 217 before referred to. As soon as the plate 209 has reached the limit of its movement, as shown in Fig. 24, its operating cam causes it to retreat and the operating cam of the plate 218 then comes into action to cause the plate 128 to follow the plate 209 back across the pocket, as shown in Fig. 25. This results in overlapping the two sides of the sheet of wrapping material on the top of the cigarettes in the pocket and in folding the ends in.

At this time the swinging gates 105 are again swung up into position to hold the wrapping material in position as folded at the ends of the cigarettes. This is accomplished by means of a slide 226 carrying a yoke 227 which is adapted to engage the studs 112 of the gates and throw the latter into operative position. The slide 226 is mounted in a bracket 228 secured to the main frame of the machine, and its lower end is pivoted to one end of a link 229. The other end of the link 229 is pivoted to a cam lever 230 fulcrumed on the bar 117 before referred to. The cam lever 230 carries a bowl 231 tracking on the periphery of a cam 232 fast on the shaft 13 before referred to. The bowl 231 and cam lever 230 are held to their duty by means of a spring, not shown, but similar in all respects to the spring 162 before referred to.

From the position in which the initial folds of the sheet of wrapping material about the cigarettes are made, the partially wrapped cigarettes move to a position where they are ejected from the turret pocket. Between these two positions they pass under a plate 233 (see Fig. 2) secured to an arm 234, which arm is pivoted at 235 to a bracket 236 secured to the main frame of the machine. A spring 237 is coiled around the pintle of the arm 234 and exerts a downward pressure on the same in a well-known manner, so that the overlapped folds of the sheet of wrapping material lying above the cigarettes are kept down in place.

When the partially wrapped collocation of cigarettes reaches the ejecting position, the pocket plunger 100 comes to a position immediately over a plunger 238 (see Figs. 15 and 16), and the studs 112 of the swinging gates 105 come into engagement with a yoke 239 carried by a slide 240, both the slide 240 and the plunger 238 being mounted in a bracket 241 secured to the main frame of the machine. The slide 240 is connected by means of a link 242 to a cam lever 243 fulcrumed on the bar 117 before referred to. This cam lever 243 carries a bowl engaging a slot in one side of the cam wheel 244. The plunger 238 is connected by means of a link 245 with a cam lever 246 also fulcrumed on the bar 117. The cam lever 246 carries a bowl engaging a groove in the opposite side of the cam wheel 244. It is to be understood that the grooves in this cam wheel are shaped to provide the proper movements for the slide 240 and the plunger 238 at the proper time. The slide 240 is operated first and this throws the swinging gates 105 to open position. The plunger 238 is then operated and this results in pushing the partially wrapped package up out of the pocket.

In passing up out of the pocket, the overhanging and overlapped upper parts of the wrapping material are bent downwardly by stationary folding devices 248 which are in the form of vertical metal plates adjacent the package. The lower flaps are folded up in a subsequent operation immediately following the lateral movement of the package now to be described.

Mounted above the pocket at this position is a bar 249, upon which is mounted a slide 250 which has a depending fixed wall 251 for the purpose of pushing the package out of the pocket. A plunger 252, the lower end of which terminates in a plate 253, overlies the partially wrapped collocation of cigarettes. This plunger and plate are normally held in their lowermost position by gravity. When the plunger 100 is moved upward to eject the partially wrapped collocation of cigarettes from the turret pocket, the plate 253 and plunger 252 are lifted. The plate and plunger have, however, sufficient weight to retain the overlapped portions of the wrapping material in a smooth position upon the cigarettes.

As soon as the cigarettes are transferred from the turret pocket, the slide 250 is given a movement to transfer said cigarettes with their wrapping in an outwardly and radial direction onto the floor of a guideway 254 which extends radially outwardly from the turret pocket and over to another guideway at right angles thereto. Covering the guideway 254 is a hinged cover 255, and the upwardly flared edge 256 thereof nearest the pocket is positioned very near the limit of lateral movement of the plunger 252. This cover holds the top flaps down during transit. The said guideway 254 is mounted upon the surface 257 of an independent framework mounted adjacent the framework which supports the turret and its operating mechanism. The standards supporting the surface 257 are denoted by numerals 258.

The mechanism for effecting this movement is as follows: The slide 250 has a stud 259, to which is pivoted one end of a link 260, the other end of the link 260 being pivoted to an arm 261 which is loosely mounted upon a stud 262. Underlying the arm 261 is a bell crank lever 263—264. This bell crank lever is also loosely mounted upon the stud 262. The arm 264 of the bell crank lever carries a bowl 265 tracking in a cam groove 266 formed in the cam 206 before referred to. The arm 263 of the bell crank lever is provided with lateral projections 267—267, one lying on either side of the arm 261. Springs 268—268 are interposed between these lateral projections and the arm 261. The movement of the bell crank lever is slightly in excess of the movement of the arm 261, the springs 268 taking up this excess movement. This construction is of a well-known character and is employed for the purpose of insuring the accurate alinement of the slide 250 with a pocket turret and also with ejecting mechanism.

Folding members for folding up the bottom flaps previously referred to are provided in the path of movement of the slide 250 and are designated 269—270. They both act to fold the bottom flaps upwardly against and over the previously folded upper flaps. In this condition the package is moved radially outwardly from the guideway 254. These curved bending devices are constructed on the same principle as the members 341 and 342 of the folding box to be described later.

The upper end of the plunger 252 carries a bowl 271 which tracks on a stationary cam 272. This cam is shaped to hold the plunger in its uppermost position during the transfer of a package and holds it up during the greater part of the return movement, but, at the latter part of the return movement, it permits said plunger to fall by gravity to its normal position where it is ready for the next operation of holding down the cigarettes during their upward ejection.

In case there occurs an interruption in the feeding forward of a package from the turret mechanism, it is desirable to stop the feeding of a foil sheet so that there will be no obstructions caused in the machine. This may be accomplished by a clutch mechanism operating on a shaft 319 hereinafter described to stop its operation temporarily until another package makes its way forward. The mechanism is shown in Figs. 15 and 16 where a bell crank 273 is shown having an arm 274 in position to be engaged by the roller 271 of the plunger 252 when it moves up with a package, and as a result of this action an arm 275 is depressed, thereby moving downwardly an adjustable link 276 and throwing out a knife 277 which is in normal engagement with the shaft 319 which has a cam actuated clutch thereon of well known construction. The cam surface on the clutch disengages laterally and axially movable pins which form part of the clutch mechanism, and thereby prevents rotation of the shaft 319. The clutch is so mounted that it normally rests against the shaft and would therefore prevent operation if not lifted, this mounting being supported on a pivot such as 277' and the parts arranged so that the knife will drop by the action of gravity on the mechanism. The foil, as hereinafter described, feeds forward by a ratchet mechanism and therefore its feeding is intermittent, while the shaft 319 is driven from the shaft 16 continuously. The clutch mechanism is so arranged, as will be seen, that the clutch will operate when no package moves up from the turret, in time to stop the feeding of the sheet of foil which was intended for that particular package. In the proper running of the mechanism, there will be no distortion of the packages in the turret, but accidents may occasionally take place and it is therefore desired to avoid the feeding of a sheet of foil and its consequent distortion in the remaining parts of the machine, which would occasion trouble for the packages which are to follow.

As the result of the forward motion of the packages, they finally arrive successively at the position denoted by numeral 300 in Figures 2 and 30. When in this position, the package is moved forward by a plunger 301, which is provided with a soft tip or nose 302 and is connected by the following mechanism: A rod 303, attached to the bottom of the plunger, is connected by an adjustable link 304 to a pivoted arm 305, pivoted at 306 and provided with a roller 307 which travels along the face of a cam 308 on a shaft 308' designed to cause the assembled parts to reciprocate the plunger back and forth and thereby advance the packages from the position 300 over to the pocket in the receiving dial to be described later. Weighting means 309 is attached to the rod 303 to normally cause the plunger to occupy a position at the extreme right. A spring may be substituted for this weight.

While driving forward, the package moves over a felt-tip metal plate 310 which is arranged to travel back and forth across the gap in the surface 257 of the frame and located beneath the channel for the foil to be described later. This plate is actuated by the forward movement of the package and is intended to prevent wrinkling of the foil by keeping it in an extended straight condition against the curved edge adjacent the slot in the surface 257. A pivot member 310ª covered with felt serves to press the vertical sheet of foil against the rounded edge of the lower part of the vertical guideway, so that the foil will remain un-wrinkled and fold properly.

As the package advances from the position 300, it is driven into a severed sheet of tin foil about to be wrapped about it, and the means for providing this foil sheet are as follows: A roll of tin foil 311 is mounted, as shown, and the foil unwound therefrom passes between continuously feeding rollers 312 and 313 to an oscillating roller 314 which serves to weight the advancing foil sheet down in order to keep it in an extended, smooth, and taut position. The foil sheet thence passes over a roller 315 and down between this roller and another roller 316, which may be covered with a soft material like rubber. The foil sheet is delivered in a vertical condition into the guide 317 and is severed by suitable knives 318. The power for driving the foil feeding mechanism is derived from a shaft 319, which is connected by a chain 320 to the shaft 308' and the latter is connected by a chain 320' to the shaft 16 of the other part of the machine. On the shaft 319 is mounted a cam 321, which co-operates with a roller 322 on a pivoted link 323 receiving in its slotted end a link 324 attached to a plate 325 which carries a pawl 326 engaging a ratchet wheel 327 mounted on a shaft 328. On this shaft is mounted a gear 329 which meshes with a pinion 330, whereby an intermittent drive is imparted to the rollers 315 and 316.

thus intermittently feeding forward the foil sheet. The foil travels continuously from the reel 311, and therefore the oscillating roller 314 moves up and down because of the periodic stoppage of the roller 315. During this up and down motion, the roller 314 is caused to move with great regularity and exactness in order to prevent any side shifting of the foil or any unevenness in its surface, or any tilting of the roller. This is accomplished by providing pinions 331 at the ends of the roller 314, these pinions travelling in fixed racks 332.

Knives 318 are operated from a cam 333 on the shaft 319, which cam co-operates with a roller 334 on a bell crank 335, to the upper end of which is attached the movable shear link 335' of the aforesaid knives 318. This shear closes when the cam is in a certain part of its revolution and thereby severs the foil.

The guideway 317 is tapered, as shown, and vertically beneath it is a slot in the surface 257 of the main frame, this slot being designated 336. The forward edge thereof is curved, as shown, so that the foil will not be ruptured, and the lower edges of the guideway are also curved. The foil is unsupported immediately after being cut, but is immediately pushed forward by the advancing package and, therefore, does not have time to drop. It is, moreover, engaged by the plate 310ª.

As the package moves forward from position 300, it is driven through a folding box 337, which is similar to that described in our Serial No. 556,952. This folding box comprises an upper plate 338, pivoted at 339, and an irregularly shaped member 340 covered with a soft material, such as felt, for the purpose of tucking in the extending edges of the foil sheet against the side of the package, this operation being the first folding operation and occurring simultaneously with the folding down of the upper and lower parts of the foil sheet against the top and bottom of the advancing package. Adjacent this member, are a lower inclined folding member 341 for folding up the bottom edge of the foil, and a corresponding upper inclined folding member 342 for folding down the upper edge of the foil over the lower edge after it has been folded up against the package. The interior of this folding box is rectangular in cross-section, and the corners are provided with small fillets so as to fold the foil neatly without tearing. The face of the advancing plunger is shaped to fit the folding box exactly.

After the folding operation is completed, the package with the foil around it is driven into a pocket 343 within a dial 344 which is mounted upon a shaft 345. As soon as the package is within the pocket, the plunger withdraws. The pocket is provided with a movable side wall 346 sliding along an inclined face 347 and operated by a cam in such a manner that when the package is driven into the pocket, it will be tightly held therein by reason of the previous movement of the wall 346 outwardly from the center of the dial. This cam is denoted by the numeral 348 and has therein a groove 349 within which travels a roller 350 which is mounted upon the side wall 346. The cam is arranged to retract the movable side walls 346 to facilitate the ejection of the package after its 180 degree turn.

As soon as the package is securely lodged in the pocket of the dial, the plunger withdraws and fusing irons 351 move in laterally against the overlapping flaps at the side of the package in order to seal them. The irons have a V-shaped recess at one end, so as not to contact with foil of single thickness, and they are otherwise designed upon the same principle and for the same purpose as the irons described in the patent to Conley, No. 1,398,840. They are maintained at the proper temperature by a rheostat, so as not to fuse the thin foil. The irons maintain their vertical position during their inward movement, and directly after this movement the end tuckers 352 and 353 move in to tuck in the extending edges of the foil at the rear of the package. These end tuckers withdraw after having completed their operation at about the same time as the fusing irons withdraw, and they are quickly followed by the upward movement of the bottom tucker 354, which operates to fold up the bottom extending edge of the foil, and the top tucker 354ª which folds down the top flap while the tucker 354 is still in position against the package. After the withdrawal of these tuckers, the dial rotates through 90° counter-clockwise. The bottom tucker 354 remains in place while the top tucker 354ª descends to fold down the upper end flap which is folded down over the tucker 354; but the latter descends while the tucker 354ª is still in its lowermost position, that is in contact with said flap.

The mechanism for moving the fusing irons in is as follows: A slide 355 is attached to the fusing iron, which may preferably pass through it, as shown, and this slide has a depending portion 356 which travels in guideway 357 attached to the framework 258. A roller 358 mounted upon a slide contacts with the bevelled edge of a plate 359 horizontally positioned and moved backward and forward by a rod 360 pivoted to an arm 361 which is, in turn, pivoted at 362 and provided with a roller 363 which travels upon the cam 364. This cam is designed to cause the connected parts to reciprocate the horizontal plate 359, so as to force the rollers 358 outwardly and inwardly to cause the slide 355 and iron 351 to move. The plate 359 will have two beveled edges and there will be two rollers 358 to operate both irons 351. A spring 358' is suitably connected to the slides 355 to cause them to move inwardly when the flap 359 is withdrawn.

The mechanism for operating the end tuckers is as follows: Links 365 are pivoted to the ends of the end tuckers, which are provided with suitable lugs therefor, and these links are, in turn pivoted to links 366 which are mounted upon pivots 367 and provided with rollers 368 to engage cams 369, these cams being designed to cause the connected parts to move the end tuckers 352 and 353, inwardly after the plunger 301 withdraws. Springs 369' serve to withdraw said end tuckers.

The mechanism for operating the bottom tucker is as follows: The tucker is connected to a bar or rod 370 which is connected with a bell crank 371—372 pivoted to a rod 373, which is pivoted at 374 to an arm 375, and the latter is pivoted at 376 to the frame. It has a roller 377 contacting with a cam 378 mounted upon the shaft 379. The cam is designed to cause the connecting parts to move the bottom tucker 354 upwardly immediately after the end tuckers have withdrawn.

The mechanism for operating the top tucker 354ª is as follows: The tucker is attached to a rod 380 which is connected by a link 381 and a rod 382 to a bell crank 383 having at the end thereof a roller 384 in engagement with a cam 385 on a shaft 386 and so constructed that the cam will cause the connected parts to move the vertical tucker 354ª at the proper time to fold down the upper flap over the bottom tucker, after which both tuckers move away from the end of the package and leave it free for the subsequent counter-clockwise rotation through 90° to a vertical position.

The dial is rotated by the following mechanism: The shaft 16 is connected by a sprocket chain drive 387 to a shaft 388 having a gear 389 which meshes with a gear 390, and the shaft 452 for the latter is connected by a sprocket chain 391 to a sprocket wheel 392 on the shaft 386. This sprocket chain passes over in engagement with a sprocket wheel 393 on a shaft 394 and under a sprocket wheel 395 over to the sprocket wheel 392, and thereby drives the shaft 394 and the shaft 386. On the shaft 386 is mounted the Geneva gear movement for operating the dial, and this comprises the segmental circular disc 396 having attached thereto the arm 397 carrying a roller 398 which is intended to enter successively the four recesses 399 in a rotatable member 400 keyed on the shaft 345. This member 400 has four circular peripheries to coincide with the circular portion of plate 396, so as to prevent rotation of the shaft 345 and the dial mounted thereon, except when the roller 398 is engaged with one of the recesses 399 for the purpose of rotating the dial.

A second segmental circular disc 401 mounted on the shaft 394 is positioned to have its circular periphery engaging the aforesaid circular peripheries of the member 400. This circular disc has a cut-out portion 402 so positioned with reference to the other segmental disc 396 that proper clearance will be provided for the intermittent rotation of the member 400, the function being to prevent the latter from making an overthrow during the operation and to keep it in exact position whereby the dial will also be prevented from overthrow.

When the package is in its uppermost position, a vertical fusing iron 403 is caused to descend to fuse the end flaps, and thus complete the sealing of the foil package. The mechanism for operating sealing iron 403 is as follows: The iron is mounted within a plate 404 which slides in a groove 405 upon a fixed standard 406, and the plate 404 carries a rod 407 provided with a roller 408 which travels in a groove upon the end of a cam lever 409 pivoted at 409' which is provided with a roller 410 cooperating with a cam 411 upon the shaft 386, the cam being designed to cause the fusing iron to descend by gravity at the proper time when the package has arrived in its uppermost position, and to elevate the iron during the remaining period of the rotation.

When the package comes to the vertical position on the top of the dial, it passes between two spring-held vertical plates 412 and 413 which are in open position when the package arrives. Just before the vertical heating iron descends, these plates are caused to move inwardly to grip the package on the sides thereof so that they will not become distorted during the fusing operation immediately following. In order to cause this movement, there is provided on the disc 401 a cam track 414 on which rides a roller 415 mounted on an arm 416 pivoted to the bracket 417 at 418, and this arm is attached to a cross bar 419 held in engagement with the cam by a spring (not shown) and in turn connected to a horizontal bell crank 420 pivoted to the frame on a stud 421 and having at the end thereof a roller 422 which rides between two arms 423 and 424, both pivoted to a bracket 425 at 426 and having at the other ends thereof rollers 427 and 428 which ride against the insides of the said vertical gripping plates 412 and 413. The cam is so designed that it will cause the rollers to press outwardly against the plates as the package enters its vertical position, and to thereafter release the plates and cause them to be pressed by their springs against the package during the fusing operation. After the latter, the plates move away again to allow the package to pass on. Springs 429 in suitable cylinders attached to a part 430 of the frame actuate plungers 431 which are attached to and move the said vertical plates.

Thereafter the dial continues to rotate counter-clockwise to bring the package to the position 432 Figure 33 where the side wall 346 moves inwardly to facilitate the ejection of the package. This is caused by an advancing L-shaped plunger 433 (the operating means for which is hereinafter described) traveling in a groove 434 provided in a plate attached to the surface 257 of the main frame. The package thus ejected by the forward motion of the plunger arrives immediately beneath a weighted plunger 435, which is stationed beside the dial and has attached thereto a link 436 which is linked to an arm 437 pivoted to the frame and provided with a down-turned finger 438 for engagement with a cam surface 439 attached to the plunger 433 and so constructed as to cause the said weight 435 to move up before the package is pushed beneath it by the plunger and thereafter caused to descend so that the package will be held down and prevented from rising or slipipng back in the way of the rotating dial. The packages move along a chute 440, preferably of celluloid, over to a position directly in line with a plunger 441 traveling in guides 442, and the packages are now ready for the subsequent operation of wrapping in a paper pouch. This plunger 441 is reciprocated by mechanism (not shown) beneath the table 257 in the same manner as the plunger 301. Both plungers have springs such as 296 attached to them, said springs being passed around rods 297 for support with their ends 298 connected to flexible chains 295 fastened to the frame at 299, so that the chains become taut and pull on the springs near the end of the movement of the plungers.

The operation of providing a paper wrapping or pouch around the sealed and fused tin foil now follows: The paper is folded around the foil package in much the same manner as the foil is folded around it, except that the paper is previously dimensioned and cut so that it will not extend out beyond the end of the package to provide end flaps, but will come just flush with the end of the package, thereby providing what is known as a pouch. A sheet of paper, used as a wrapper, is previously cut to the required size, and, by a suitable mechanism now to be described, is positioned vertically in advance of the plunger and the folding box, so that the package is driven into it in much the same manner as in the previous operation where the vertical foil sheet was folded around the package in the folding box 337.

The mechanism which supplies the paper is constructed as follows: A receiving frame or box 443 is mounted to receive the sheets of paper cut to the proper size, and from this box the sheets are moved one by one by the action of a roller 444 which is covered with a soft material, for example like rubber, and slides the sheet out from the bottom of the pile to the conveying mechanism. This roller 444 is mounted on a shaft 445 which is journaled in one end of a bell crank 446 whose other end is provided with a roller 447 which travels on a cam 448, whereby the bell crank is oscillated at the proper time to bring the roller 444 in contact with a sheet of paper and remove it. The cam shaft 449 is driven by a sprocket chain 450 passing over a sprocket 451 on the shaft 452.

The means for rotating roller 444 comprises a gear 453 on the shaft 449 meshing with a gear 454 on a shaft 455 which carries at its opposite end a pinion 454$^a$ in engagement with a gear 456 meshing with a gear 457 on the shaft 445.

Figure 35:
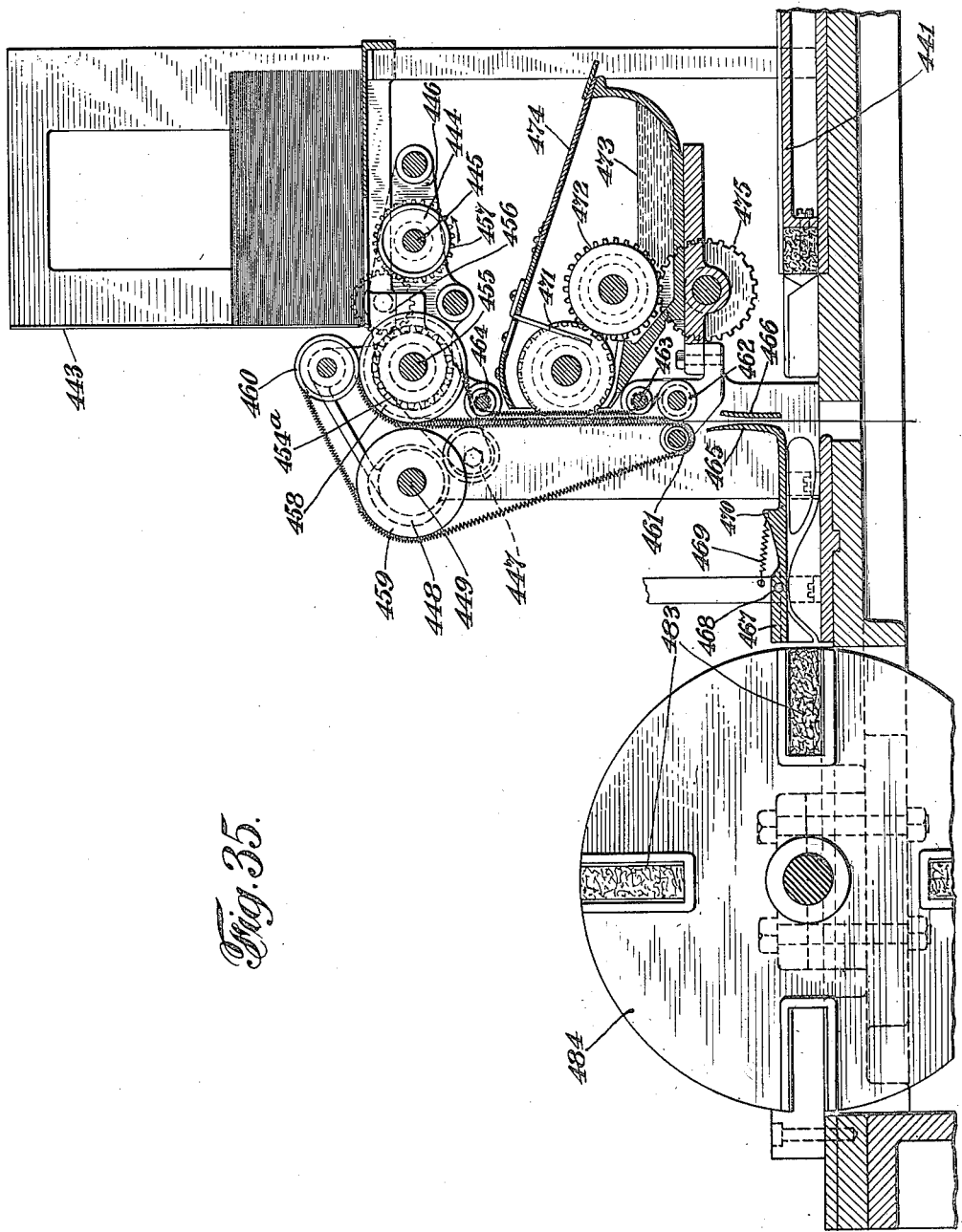
Fig. 35 is a side elevation of the paper pouch forming mechanism and the last rotary dial.

The paper upon being advanced by the roller 444 passes over and around the face of a roller 458 and down between this roller and a second roller 459. These rollers are mounted on the shafts 455 and 449. It is moved forward by a system of helical springs which bring it down to a position in front of the plunger 441, as shown in Fig. 35. These helical spring conveyors comprise two endless springs, the first of which passes around grooves in the roller 459, around grooves in a roller 460, thence along the surface of the roller 458, and downwardly to the bottom of its course around a roller 461 and back up to the roller 459. The second endless spring conveyor passes around grooves in the roller 458, then vertically down around a roller 462, around a guiding roller 463, and thence up upon a roller 464, from which it passes back to the roller 458. The sheets of paper are delivered from the box 443 to the top of the roller 458 and are passed between the two helical spring conveyor systems which carry it downwardly into a guideway formed by members 465 and 466 where it is in position to be advanced by the oncoming package. The member 465 is an up-turned portion of the top 467 of the folding box, and this top is hinged at 468 to a part of the frame to which is attached a spring 469 connected to the top of the folding box at 470 so that the member 465 is normally held in its upper position. If desired, the paper may be provided with adhesive material along desired portions thereof, and this may be accomplished by rollers 471 and 472 in engagement with each other and in communication with an adhesive liquid 473 in a tank 474, the rollers being driven by gears as shown, in mesh with a gear 475 driven by a chain or other means from the shaft 455.

For the purpose of preventing the feed of a sheet of paper whenever there is an omission in the advance of a package along the celluloid guideway 440, there has been provided a clutch disengaging means as shown in Fig. 45. This means consists of a vertically fixed weight 476 on the end of a lever 477 which is normally in its lower position due to its weight on the lever system, and may be lifted up by the passage of a package beneath it. When this occurs, the link 478 is pulled downwardly and disengages the knife edge 479 from the clutch 480 on the shaft 449 so that paper will continually be fed forward by reason of the uninterrupted rotation of the shaft 449. A weight 481 is mounted at the end of a clutch lever 482 to balance the system. After the paper has been preferably provided with adhesive material, and has advanced in front of the package and plunger 441, it is pushed forward by the said package into the folding box shown in Fig. 35, and folded therein about the package in a manner similar to that in which the foil is folded about the package in folding box 347, the construction of these two boxes being substantially identical in principle. As thus folded, the package now comprises a completely hermetically sealed foil covering which is inserted within a paper pouch. This is driven forward by the plunger 441 into a pocket 483 of a dial 484 which is provided with four pockets similar to the dial 344. These pockets have, however, fixed walls. Adjacent this dial are circular felt plates 485 and 486 which serve to hold the paper pouch together until the adhesive material has firmly cemented the overlying flaps. The package is rotated counter-clockwise through 180° and delivered to a position in which it may be ejected along a suitable guideway at 487 by a plunger 488 similar to the plunger 433 and actuated simultaneously therewith by means of a link 489 actuated by a shaft 490 having fixed thereon a collar 491 provided with an arm 492 which may be swung through an arc by a lever 493 pivoted at 494 to a standard 495 and operated by a cam 496 contacting with the roller 497 upon the end of the lever. At the other end of this same shaft 490 is a similar arrangement for reciprocating the plunger 433 so that both plungers 433 and 488 move simultaneously. The package when ejected by the plunger 488 is in finished condition and is ready for packing.

The dial 484 is rotated by means of a sprocket chain 498 passing around sprockets 499 and 500 so that the dials 484 and 344 are driven in the same direction by the same means and at the same time, intervals and speeds.

In the operation of the machine, the cigarettes are counted out and deposited on a sheet of paper which is to form the first wrapper, in the turret mechanism, which forms the principal disclosure of Figures 1 to 16 and which is disclosed in the patent to E. D. Smith, No. 1,114,053. The method of wrapping these cigarettes in the paper wrapper is the same as that disclosed in said patent up to the point where the package is ready to be removed from the turret pocket or folding box. At this point there is a difference in operation over said patent which is as follows:—

When the paper package is lifted up by the vertical plunger, the upper end flaps are folded down by the folding members 248 and thereupon the package is moved sidewise into the folding box wherein the lower flaps are folded up over the top flaps and the package is held in this position during its transit through the guideway which is provided with a cover to hold the top of the package down. The packages are moved along by a displacement caused by the introduction of successive packages, but they may also be moved along by the positive moving means which moves individual packages. In the present embodiment seven packages are accommodated in the guideway. At the end of the guideway the packages are advanced by the plunger which strikes them in time to move them into the sheet of foil so that the latter may be folded about the package to provide even overlapping edges and which also provide support for the forward end flap. The foil is folded around the package to provide overlapping edges at the sides thereof and extending rear edges or extensions which are not folded at this time. After passing through the folding box the foil package is moved into the dial pocket where it is firmly held by the side wall. The rear extensions are folded in by the side tuckers and by the bottom and top tuckers successively, the bottom tucker withdrawing first when the operation is finished and the fusing irons moving in to fuse the overlapping edges at the sides during the end folding operation. Thereafter the dial rotates 90° counterclockwise to bring the package into the topmost position where the side plates grip it and the top fusing iron descends to fuse the top flaps. The dial rotates through another 90° whereupon the package is ejected by the plunger and advanced along the celluloid guideway by displacement, the weight 435 holding down the package and preventing a backward movement in the path or way of the dial by virtue of the cam mechanism. The celluloid guideway allows the packages to move along without friction. At the end of this guideway a plunger moves the packages successively into the paper pouch forming mechanism which provides a paper pouch and from this operation the packages go to the second dial where they are held by the felt covered discs long enough to secure the overlapped paper edges by means of the glue applied by the rotating discs forming part of the paper pouch forming mechanism. Thereafter the packages are ejected by a plunger from this second disc which has rotated counterclockwise through 180°.

As a result of these operations there is produced a package having an inside paper wrapper which has not been sealed or fastened and a foil wrapper which has been hermetically sealed by fusion. These two wrappers are enclosed within a paper pouch or other covering, but this covering may be left off if desired although it is preferable to provide such a wrapper or pouch. The foil wrapper has overlapped edges along the sides of the package and overlapping flaps at one end, there being no overlapping portions at the other end. The various mechanisms are carefully designed to provide for even positioning of the foil about the package and for avoiding unnecessary folds and wrinkles. Furthermore, the mechanism should be carefully adjusted in the cam motions and other timed mechanisms so that that foil will not be handled in such a manner as to break it or crumple it, since thin foil is particularly difficult to handle in an automatic mechanism owing to its liability to tearing and forming undesired creases and folds.

The reel 311 is mounted on a spool which is free to rotate except that it is friction held, as for example by spring fingers 311' so that the foil will not unwind too freely, as otherwise too much would be fed forward and would become disarranged. The rollers 312 and 313 are constantly running and the other pair, namely 315 and 316, run intermittently, the rollers 312 and 316 being rubber covered and of the same diameter, while the rollers 313 and 315 are of the same diameter but are made of metal with no rubber covering. The compensating roller 314 is rubber covered and its axis is always parallel with the axes of the feeding rollers, its function being to take up the slack between intermittent feeds. The bearings of the compression roller of the constantly running pair of rollers, that is, the roller 312, are adjusted to make the foil feed evenly and in the middle of the roller. The foil must be properly positioned so that when it arrives in the guideway 317 it will be centered with respect to the package at 300, and for this purpose the reel 311 may be adjusted in position as by a collar and set screw (see Fig. 31), after which the constantly running rollers will prevent the foil from moving sidewise and the roller 314 assists in this operation.

As the foil and package move forward into the folding box 337 the upper extending surfaces of the foil are in a horizontal position between the cover 338 and the rear wings 340, and the latter hold them in this position until just before the depending inclined side plates 342 begin to fold them down, this operation giving the time necessary for the proper curving and folding of the foil. Similarly the inclined plates 341 are sufficiently separated from the slot beneath the guide 317 so that the foil will not start to be folded up into a vertical position until it has just cleared the slot and its rear end is passing beneath the rear ends of the wings 340. The purpose of this arrangement is to give the foil time to adjust itself for the folding operation. The descending foil sheet in the guide 317 must be allowed to descend to such a point that the package will bisect it, that is, be positioned centrally thereof so that the foil flaps will be even; and the foil sheet must be in position in time to support the forward unfastened flaps of the package as it is placed in the position 300. The plunger holds the rear flaps as it pushes the package forward. The paper wrapper is thus held around the package during its movement through the guideway or other conveying means, and as the package moves into the position 300 the flaps are held by the foil and by the plunger. After the package passes through the foil wrapping operation, it arrives in the dial pocket where the end tuckers immediately act upon the extending rear surfaces of the foil, which action is quickly followed by the side sealing operation and the top and bottom tucking operations so that no opportunity is given for the paper and foil wrappings to open up. The paper is not sealed with a sealing gum or similar composition, for it is a disadvantage to seal the paper wrapper with a gum since the heat of sealing the foil would crystallize the gum and would also discolor it.

The electrical fusing irons are connected in series with a suitable rheostat or resistance element so that by varying the resistance, the heating of the irons can be controlled within a few degrees of temperature, thereby avoiding underheating or overheating of the foil itself.

As many apparently widely different embodiments of this invention may be made without departing from the spirit thereof, it is to be understood that we do not intend to limit ourselves to the specific embodiment thereof except as indicated in the appended claims.

We claim:

1. In a machine for the purpose described, the combination of means for wrapping cigarettes and the like with a paper wrapper, and means for hermetically enclosing said wrapper with a sheet of foil without sealing said paper wrapper.

2. In a machine for the purpose described, the combination of means for wrapping cigarettes and the like with a wrapper, means for enclosing said wrapper with a hermetically sealed foil sheet, and means for forming a paper covering about the foil enclosed package.

3. In a machine for the purpose described, the combination of means for wrapping cigarettes and the like with a wrapper, means for enclosing said wrapper with a hermetically sealed foil sheet without sealing said first named wrapper, and means for forming a paper covering about the foil-enclosed package.

4. In a machine for the purpose described, the combination of means for wrapping cigarettes and the like with a wrapper, means for enclosing said wrapper with foil, means for hermetically sealing the foil by fusion, and means for forming a covering about the foil-enclosed package.

5. In a machine for the purpose described, the combination of means for wrapping cigarettes and the like with a wrapper, means for enclosing said wrapper with foil without sealing or fastening the wrapper, means for hermetically sealing the foil by fusion, and means for forming a covering about the foil-enclosed package.

6. In a machine for the purpose described, the combination of means for wrapping cigarettes and the like with a wrapper to form end flaps overlying each other, and means for hermetically enclosing said wrapper with foil without sealing said first named wrapper.

7. In a machine for the purpose described, the combination of means for wrapping cigarettes and the like with a wrapper in a rotatable turret, means for removing the package from the turret, and means for hermetically enclosing said wrapper with foil without sealing said first named wrapper.

8. In a machine for the purpose described, the combination of means for wrapping cigarettes and the like with a wrapper in a rotatable turret, means for removing the package from the turret radially along a guideway, a plunger for horizontally moving the package along a second guideway at right angles to the first, and means for thereupon hermetically enclosing said package with foil.

9. In a machine for the purpose described, the combination of means for wrapping cigarettes and the like with a wrapper in a rotatable turret having pockets to receive the cigarettes and wrapper, means for removing the formed cigarette package from a pocket and to a guideway, means for transferring the package along said guideway, and means for thereafter hermetically enclosing said package with foil without first sealing said first named wrapper.

10. In a machine for the purpose described, the combination of means for wrapping cigarettes and the like with a wrapper in a rotatable turret having pockets to receive the cigarettes and a paper wrapper, means for lifting the formed package to the level of a guideway which extends radially from said turret, means for pushing the package along the guideway, and means for thereafter hermetically enclosing the package with foil without first sealing the paper wrapper.

11. In a machine for the purpose described, the combination of means for wrapping cigarettes and the like with a paper wrapper to provide end flaps, in a rotatable turret having vertically movable pockets to receive the cigarettes and the wrapper, means for lifting the partially formed packages out of the pockets, folding means for folding down the upper end flaps of the packages as they are lifted, folding means for folding up the lower end flaps, means for advancing the package to a mechanism for wrapping the packages with foil, and means for hermetically enclosing the package with foil without sealing said first named wrapper.

12. In a machine for the purpose described, the combination of means for wrapping cigarettes and the like with a wrapper, means for enclosing said wrapper with foil without fastening said first wrapper, and means for sealing said foil by fusion along overlapping surfaces.

13. In a machine for wrapping cigarettes and the like with a wrapper, a rotatable dial having pockets, means for intermittently driving the dial comprising a segmental circular plate having driving means for rotating a member on the dial shaft having circular peripheries to receive the said plate, and a second segmental circular plate having its rim within said circular peripheries of said member to prevent overthrow.

14. In a machine for wrapping cigarettes and the like with a wrapper, a rotatable dial having pockets, means for intermittently driving the dial comprising a segmental circular plate having an arm working in slots in a member on the dial shaft having also circular peripheries to receive the said plate, and a second segmental circular plate having its rim within said circular peripheries of said member to prevent overthrow.

15. In a machine for wrapping cigarettes and the like with a wrapper, a rotatable dial having pockets, means for intermittently driving the dial comprising a segmental circular plate having driving means for rotating a member on the dial shaft having circular peripheries to receive the said plate, and means for preventing overthrow of the said member.

16. In a machine for the purpose described, a vertical rotatable dial having pockets to receive partially wrapped cigarettes, means for completing the wrapping and sealing of the package while within the dial, and a celluloid channel along which the package is ejected.

17. In a machine for the purpose described, a vertical rotatable dial having pockets to receive partially wrapped cigarettes, means for completing the wrapping and sealing of the package while within the dial, a channel along which the package is ejected, and means adjacent said dial operating to hold the package to prevent backward movement thereof in the way of the dial.

18. In a machine for the purpose described, a vertical rotatable dial having pockets to receive partially wrapped cigarettes, means for completing the wrapping and sealing of the package while within the dial, a channel along which the package is ejected, and a cam operated weight adjacent said dial to prevent backward movement of the package in the way of the dial.

19. In a machine for the purpose described, a vertical rotatable dial having radial slots or pockets to receive partially wrapped cigarettes, means for completing the wrapping and sealing of the package while within the pockets, and spring-pressed plates adjacent the sides of the dial for holding the sides of the package during the sealing operation that is performed at the end of the package.

20. In a machine for the purpose described, a vertical rotatable dial having pockets to receive partially wrapped cigarettes, means for completing the wrapping and sealing of the package while within the dial, movable walls for the pockets having sliding engagements with faces provided within the dial, arms on the said walls carrying rollers, and a cam on the dial shaft engaging said rollers whereby the said walls are periodically moved to grip the packages.

21. In a machine for the purpose described, a vertical rotatable dial having pockets to receive partially wrapped cigarettes, means for completing the wrapping and sealing of the package while within the dial, a channel for conveying packages from the dial, and a paper wrapping machine to receive the packages from said channel by means of a reciprocating plunger at right angles to said channel.

22. In a machine for the purpose described, a rotatable dial having pockets to receive partially wrapped cigarettes, means for completing the wrapping and sealing of the package while within the dial, a channel for conveying packages from the dial, a paper wrapping machine to receive the packages from said channel, and a second dial having plates at its sides to assist in the sealing of the paper wrapper.

23. In a machine for the purpose described, a rotatable dial having pockets to receive partially wrapped cigarettes, means for completing the wrapping while within a pocket, means for sealing overlying flaps of the wrapper, means for rotating the dial, means for further sealing the package while at rest and tightly gripped at its sides, and means for discharging it.

24. In a machine for the purpose described, a rotatable dial having pockets to receive partially wrapped cigarettes, means for completing the wrapping while within a pocket, a laterally movable fusing iron for sealing the sides of the package while within a pocket, means for rotating the dial a quarter of a revolution, a vertical fusing iron for sealing the end of the package, and means for discharging it.

25. In a machine for the purpose described, a rotatable dial having pockets to receive partially wrapped cigarettes, means for completing the wrapping and sealing while within a pocket, a conveying channel leading to a wrapping and sealing mechanism, a wrapping mechanism, and a second dial having pockets therein and driven simultaneously with the first dial, and means to complete the sealing of the package while within said second dial.

26. In a machine for the purpose described, a rotatable dial having pockets to receive partially wrapped cigarettes, means for completing the wrapping and sealing while within a pocket, and a second dial having pockets therein and driven simultaneously with the first dial, and plates adjacent said second dial to engage the sealed package until it is firmly sealed.

27. In a machine for the purpose described, a rotatable dial having pockets to receive partially wrapped cigarettes, means for completing the wrapping and sealing while within the pocket, means for moving the package to a paper wrapping machine, and means for disconnecting the paper feeding means when no package is moved forward, said means comprising an arm in the path of the packages and engageable by them to actuate the paper feeding means.

28. In a machine for the purpose described, a wrapping machine for wrapping a package with sheets of wrapping material, a channel or guideway along which the packages are advanced to said machine, and means for disconnecting the driving shaft of the said wrapping machine when no package is moved forward, said means comprising a projection in the path of the packages and engageable by them to actuate a clutch on the driving shaft.

29. In a machine for the purpose described, a foil feeding means comprising a means for feeding foil down through a vertical guide having an aperture for the transit of a package, rounded corners at the forward junctions of the guide and aperture, and pivoted plates mounted to contact with the rounded corners to hold and steady the foil during its descent.

30. In a machine for the purpose described, a foil feeding means comprising rollers for feeding the foil down through a vertical guide having an aperture for the transit of a package, rounded corners at the forward junctions of the guides and aperture, and upper and lower movable plates mounted to swing against and contact with the rounded corners to hold and steady the foil during its descent.

31. In a machine for the purpose described, a reciprocating plunger for advancing packages along a channel, and means to check the forward movement of the plunger near the end of its stroke comprising a spring attached to the forward end of the plunger and to a looped chain attached in turn to the frame.

32. In a machine for the purpose described, a channel for supplying packages to be wrapped, a second channel at right angles thereto and in the same plane, sheet foil supplying means in said second channel, means for advancing the packages along the second channel, means for partially wrapping the packages with foil, a rotatable dial having a pocket to receive a package, folding means to fold the package while in the dial pocket, fusing irons positioned to move in against overlapping flaps of the package while within the pocket.

33. In a machine for the purpose described, a channel for supplying packages to be wrapped, a second channel at right angles thereto, sheet foil supplying means in said second channel, means for advancing the packages along the second channel, means for partially wrapping the packages, a rotatable dial having a pocket to receive a package, fusing irons and folding means to seal the package while in the dial pocket, means to eject it, and a wrapping machine for providing a paper wrapper around the foil-enclosed package.

34. In a machine for the purpose described, the combination of means for advancing a package along a guideway into a second guideway at right angles thereto, means for moving the package along said second guideway, means for feeding a sheet of foil into the path of the package, means for folding the foil about the package to provide overlapping edges and a rear extension, a holding means for gripping the sides of the package, means for fusing said overlapping edges, means for folding said rear extension, means for fusing it, said fusing and folding operations being performed while the package is held in said holding means, means for ejecting the package from the holding means along a channel, and means for providing the package with an outside paper covering.

35. In a machine for the purpose described, the combination of means for advancing a package along a guideway into a second guideway at right angles thereto, means for moving the package along said second guideway, means for feeding a sheet of foil into the path of the package, means for folding the foil about the package to provide overlapping edges and a rear extension, a holding means for the package, means for fusing said overlapping edges, means for folding said rear extension, means for fusing it, said fusing and folding operations being performed while the package is held in said holding means, and means for ejecting the package from the holding means along a channel.

36. In a machine for the purpose described, the combination of means for advancing a package along a guideway into a second guideway at right angles to the first, means for moving the package along said second guideway, means for feeding a sheet of foil into the path of the package, means for folding the foil about the package to provide overlapping edges and a rear extension, an intermittently rotating dial having a pocket for the package, means for fusing said overlapping edges, means for folding said rear extension, means for fusing it, said fusing and folding operations being performed while the package is held in the dial, and means for ejecting the package from the dial.

37. In a machine for the purpose described, the combination of means for advancing a package along a guideway into a second guideway at right angles to the first, means for moving the package along said second guideway, means for feeding a sheet of foil into the path of the package, means for folding the foil about the package to provide overlapping edges and a rear extension, an intermittently rotating dial having a pocket for the package, means for fusing said overlapping edges, means for folding said rear extension, means for fusing it, said fusing and folding operations being performed while the package is held in the dial, means for ejecting the package from the dial along a guideway at right angles to the dial, and a paper wrapping machine positioned at the end of said guideway to receive the package and wrap it with a paper cover.

38. In a machine for the purpose described, the combination of means for advancing a package along a guideway into a second guideway, means for moving the package along the latter, means for feeding a sheet of foil into the path of the package, means for folding the foil about the package, a holding means for the package, means for hermetically sealing the foil package while in said holding means, means for ejecting the package from said holding means along a channel, and a paper wrapping machine to enclose the foil with a paper wrapper.

39. In a machine for the purpose described, the combination of means for advancing packages along a guideway into a second guideway in the same plane, means for moving the packages along the latter, means for feeding sheets of foil into the path of the packages, means for folding foil about the packages, a rotating dial having pockets to receive the packages, fusing irons positioned to move in against the foil flaps to hermetically seal the latter while in a dial pocket, and means for ejecting the packages from the dial.

40. In a machine for the purpose described, means for wrapping cigarettes with a foil wrapper without sealing it, said operation providing overlapping surfaces and leaving unfolded only a rear extension of the wrapper, a dial having a pocket to receive the package, and means for folding in said extension and sealing it by fusion while the package is within the pocket.

41. In a machine for the purpose described, means for wrapping cigarettes with a foil wrapper without sealing it, said operation leaving an unfolded rear extension of the wrapper, a dial having a pocket to receive the package, means for folding in said extension while the package is within the pocket, and means for sealing by fusion the flaps thus formed.

42. In a machine for the purpose described, means for wrapping cigarettes with a foil wrapper without sealing it, said operation providing overlapping surfaces and leaving unfolded only a rear extension of the foil wrapper, a dial having a pocket to receive the package, means for folding in said extension, means for fusing the said surfaces together while the package is within the pocket, means for rotating the dial and means for sealing by fusion the flaps at the end of the package.

43. In a machine for the purpose described, means for wrapping cigarettes with a foil wrapper without sealing it, said operation leaving unfolded only a rear extension of the wrapper, a vertical rotatable dial having a pocket to receive the package, means for folding in said extension while the package is within the pocket, means for sealing by fusion the foil flaps thus formed, and means for ejecting the package after a half turn of the dial.

44. In a machine for the purpose described, means for wrapping cigarettes with a foil wrapper without sealing it, said operation leaving an unfolded rear extension of the wrapper, a dial having a pocket to receive the package, means for folding in said extension while the package is within the pocket, means for rotating the dial, means for sealing by fusion the flaps at the end of the package after a rotation of the dial, and means for supporting the sides of the package during said sealing operation.

45. In a machine for the purpose described, means for wrapping cigarettes with a foil wrapper without sealing it, said operation leaving an unfolded rear extension of the wrapper, a dial having a pocket to receive the package, means for folding in said extension while the package is within the pocket, means for rotating the dial, means for sealing by fusion the end of the package after said rotation, and spring-pressed plates for supporting the sides of the package during the sealing operation.

46. In a machine for wrapping packages with foil, the combination of a plunger for moving the package along a bed into a folding box and a dial pocket; means for supplying a sheet of foil in the path of the plunger; a folding box through which the plunger drives the package, said box having side cam plates for folding the foil at the sides of the package; a rotatable dial having pockets; means for operating the dial to bring a pocket into line with the plunger; fusing irons arranged to move in against the sides of the package after it has been deposited in a dial pocket; means to fold the extending foil at the rear of the package; and a fusing iron positioned to seal said rear end by fusion.

47. In a machine for wrapping packages with foil, the combination of means for placing packages in position before a plunger; a plunger for moving the packages along a bed into a folding box and a dial pocket, means for supplying a sheet of foil in the path of the plunger; a folding box through which the plunger drives the package, said box having side cam plates for folding the foil at the sides of the package; a rotatable dial having pockets; means for operating the dial to bring a pocket into line with the plunger; fusing irons arranged to move in against the sides of the package after it has been deposited in a dial pocket; means to fold the extending foil at the rear of the package; a fusing iron positioned to seal the said rear end by fusion; and means to eject the hermetically sealed package from the dial pocket.

48. In a machine for wrapping packages with foil, the combination of means for placing packages in position before a plunger; a plunger for moving the packages along a horizontal bed into a folding box and a dial pocket; means for supplying a sheet of foil vertically in the path of the plunger; a folding box through which the plunger drives the package, said box having side cam plates for folding the foil at the sides of the package; a rotatable vertical dial having pockets; means for operating the dial to bring a pocket into registry with the plunger; fusing irons arranged to move in against the sides of the package after it has been deposited in a dial pocket; means to fold the extending foil at the rear of the package; a fusing iron positioned to seal said rear end by fusion after a rotation of the dial; and means to eject the hermetically sealed package from the pocket.

49. In a machine for the purpose described, means for wrapping cigarettes and the like with a wrapper to provide end flaps without sealing or fastening them, a plunger for advancing the package while supporting the end flaps at one end of the package, means for delivering a sheet of foil vertically in the path of the package in time to support the flaps at the other end of the package, and a folding means for folding the foil wrapper around the first named wrapper.

50. In a machine for the purpose described, means for wrapping cigarettes and the like with a wrapper to provide end flaps without sealing or fastening them, means for advancing the package while holding the end flaps against one end of the package, means for vertically delivering a sheet of foil in the path of the package in time to support the flaps at the other end of the package against opening, folding means to fold the foil about the first named wrapper, and fusing irons to hermetically seal the foil.

In testimony that we claim the foregoing, we have hereunto set our hands this 15th day of January, 1923.

EDWIN J. CONLEY.
EDWARD J. WHALEN.